(12) United States Patent
Ohwe et al.

(10) Patent No.: US 6,940,694 B2
(45) Date of Patent: Sep. 6, 2005

(54) MAGNETIC HEAD ASSEMBLY HAVING THIN-FILM DUMMY PATTERNS PROVIDED ON SURFACE OF GIMBAL SPRING

(75) Inventors: Takeshi Ohwe, Kawasaki (JP); Toru Watanabe, Kawasaki (JP); Ryosuke Koishi, Kawasaki (JP); Seizi Yoneoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/901,063

(22) Filed: Jul. 29, 2004

(65) Prior Publication Data

US 2005/0002125 A1 Jan. 6, 2005

Related U.S. Application Data

(62) Division of application No. 08/901,940, filed on Jul. 29, 1997, now Pat. No. 6,801,398, which is a continuation of application No. 08/352,926, filed on Dec. 9, 1994, now abandoned.

(30) Foreign Application Priority Data

Dec. 10, 1993 (JP) .............................................. 5-310629

(51) Int. Cl.⁷ ................................................ G11B 5/48
(52) U.S. Cl. ................................ 360/234.6; 360/245.3; 360/245.8
(58) Field of Search .......................... 360/234.6, 245.3, 360/245.5, 245.8, 245.6

(56) References Cited

U.S. PATENT DOCUMENTS

| | | | |
|---|---|---|---|
| 4,700,250 A | 10/1987 | Kuriyama | |
| 4,761,699 A | 8/1988 | Ainslie et al. | |
| 5,003,419 A | 3/1991 | Takekado | |

(Continued)

FOREIGN PATENT DOCUMENTS

| | | |
|---|---|---|
| JP | 2-18770 | 1/1990 |
| JP | 2-91867 | 3/1990 |
| JP | 2-135914 | 11/1990 |
| JP | 03-230315 | 10/1991 |
| JP | 04-305877 | 10/1992 |
| JP | 05-128771 | 5/1993 |
| JP | 5-128772 | 5/1993 |
| JP | 5-79764 | 10/1993 |
| JP | 5-303856 | 11/1993 |
| WO | WO 83/01862 | 5/1983 |

OTHER PUBLICATIONS

Hutchinson Technology, Inc., "Type 1650 Product Summary", Sep. 14, 1992, pp. 1–9.

Patent Abstracts of Japan for Publication No. 05–128771, Published May 25, 1993; Pub. No. 04–305877, Published Oct. 28, 1992, and Pub. No. 03–230315, Published Oct. 14, 1991.

Primary Examiner—Craig A. Renner
(74) Attorney, Agent, or Firm—Arent Fox PLLX

(57) ABSTRACT

A magnetic head assembly equipped with a slider having a magnetic head and a gimbal spring on which the slider is mounted with an adhesive. The gimbal spring is supported by beam portions of a load beam. A thin-film wiring pattern formed on the load beam extends to a surface of the gimbal spring. A tip of the wiring pattern acts as a terminal portion that is connected to input/output terminals integrally formed on the slider. The slider is locked on the gimbal spring by electrically conducting bonding and an adhesive. A plurality of dummy patterns having the same height as the wiring pattern are provided at a position corresponding to where the adhesive is dropped on the surface of the gimbal spring. The adhesive is placed in an area sandwiched by the dummy patterns on the gimbal spring.

2 Claims, 22 Drawing Sheets

U.S. PATENT DOCUMENTS

| | | |
|---|---|---|
| 5,027,238 A | 6/1991 | Konishi et al. |
| 5,161,076 A | 11/1992 | Inumochi et al. |
| 5,282,102 A | 1/1994 | Christianson |
| 5,299,080 A | 3/1994 | Mizuno et al. |
| 5,299,081 A | 3/1994 | Hatch et al. |
| 5,377,064 A | 12/1994 | Yaginuma et al. |
| 5,381,289 A | 1/1995 | Fiedler |
| 5,467,236 A | 11/1995 | Hatanai et al. |
| H1573 H | 8/1996 | Budde |
| 5,550,694 A | 8/1996 | Hyde |
| 5,638,234 A | 6/1997 | Hagen |
| 5,696,651 A | 12/1997 | Endo et al. |
| 5,719,727 A | 2/1998 | Budde |
| 5,786,964 A | 7/1998 | Sone et al. |
| 5,864,446 A | 1/1999 | Endo et al. |
| 5,901,014 A | 5/1999 | Hiraoka et al. |

MAGNETIC HEAD ASSEMBLY HAVING THIN-FILM DUMMY PATTERNS PROVIDED ON SURFACE OF GIMBAL SPRING

CROSS-REFERENCE TO RELATED APPLICATIONS

This is a Division of application Ser. No. 08/901,940 filed Jul. 29, 1997, now U.S. Pat. No. 6,801,398, which in turn is a Continuation Application of Parent Application No. 08/352,926 filed Dec. 9, 1994 now abandoned. The disclosures of the prior applications are hereby incorporated by reference herein in their entirety.

BACKGROUND OF THE INVENTION

1. Field of the Invention

The present invention relates to a magnetic head assembly. More particularly, the invention relates to a magnetic head assembly which is used for a magnetic disk drive, and is made up of a slider having a magnetic head for reading data from, and writing data onto, a magnetic disk, the slider being mounted on a gimbal spring with an adhesive agent.

2. Description of the Related Art

In recent years, magnetic disk drives have been realized in ever smaller sizes and in ever lighter weights having both decreased volume and decreased height. In order to place many disks and heads in such a compact device, attempts have been made to reduce the gap among the disks and to fabricate a magnetic head-support mechanism in a small size and in a reduced thickness. Therefore, a slider for mounting the magnetic head has a decreased size in outer diameter and a decreased thickness. At present, the slider has a length, width and thickness which are all nearly halved and has a volume which is about one-eighth compared with that of sliders of ten years ago.

Even in a small and light magnetic disk drive, it has been demanded to increase the recording density of the disk accompanying an increase in the amount of data to be stored. This fact requires the gap to be narrowed between the slider mounting the magnetic head and the slider. Therefore, it has been desired to provide a slider having stabilized flying performance and, hence, to provide a slider having a more accurate shape that is little deformed by a change in the ambient temperature.

In a conventional magnetic disk drive, a magnetic disk having a diameter of, for example, 3.5 inches and a head-positioning actuator are incorporated in an enclosure. The actuator is provided with a swinging arm, and a magnetic head assembly is mounted on the tip of the arm. The magnetic head assembly is constituted by a load beam made of a stainless steel, a slider incorporating a magnetic head, and a gimbal spring interposed between the slider and the load beam.

The gimbal spring may often be provided in a tip portion of the load beam integrally therewith. In such a case, the gimbal spring is integrally formed in the load beam being partitioned by two opposing U-shaped holes formed in the tip portion of the load beam. That is, the gimbal spring is supported by the load beam via a pair of beam portions formed between the opposing ends of U-shaped holes.

The slider is mounted on the gimbal spring using an adhesive agent. By using a dispenser, the adhesive agent is dropwisely applied to the gimbal spring and, then, the slider is mounted being forced into contact with the adhesive agent.

As the slider is realized in a small size to safisfy the tendency toward decreasing the size and weight of the magnetic disk drive and increasing the reliability, however, the adhesion area becomes very small between the slider and the gimbal spring. This makes it difficult to accurately control the amount of the adhesive agent applied by using the dispenser. If the amount of the adhesive agent happens to become large, therefore, the adhesive agent applied to the adhesion surface of the gimbal spring spreads between the gimbal spring and the adhesion surface of the slider when the slider is adhered thereto with a pushing force. As a result, the slider is adhered to the gimbal spring over an increased area and is deformed, when the adhesive agent is hardened.

SUMMARY OF THE INVENTION

The object of the present invention therefore is to provide a magnetic head assembly which is capable of confining the warping amount which is one of the shaping parameters of the slider that affects the floating performance within an allowable range despite a change in the temperature around the slider, in order to stabilize the floating performance of the slider.

According to a first aspect of the present invention, there is provided a magnetic head assembly comprising a slider with a magnetic head and a gimbal spring on which the slider is mounted with an adhesive agent, wherein at least a slit is formed in a slider-mounting portion of the gimbal spring opposing the adhesion surface of the slider.

In the magnetic head assembly according to the first aspect, the gimbal spring is formed integrally with the load beam or is attached to a tip portion of the load beam. When the gimbal spring is formed integrally with the load beam, the slider-mounting portion is supported by the load beam via a pair of beam portions. When the gimbal spring is attached to the tip portion of the load beam, the gimbal spring is constituted by an outer plate portion and a tongue-shaped inner plate portion surrounded by a U-shaped hole.

Depending upon the shape of the slit formed in the gimbal spring, the amount of the adhesive agent dropping on the gimbal spring can be controlled, so that the slider is suitably adhered onto the gimbal spring.

According to a second aspect of the present invention, there is provided a magnetic head assembly comprising a slider with a magnetic head and a gimbal spring on which the slider is mounted with an adhesive agent, wherein the adhesive agent applied onto the adhesion surface of the slider after hardened has a Young's modulus which is smaller than about $1/13000$ the Young's modulus of the slider material or smaller than about $1/13000$ the Young's modulus of the gimbal spring material. In this case, the Young's modulus of the slider material may be nearly the same as the Young's modulus of the gimbal spring material.

In the magnetic head assembly according to the first aspect of the present invention, the adhesive agent applied onto the gimbal spring from the dispenser is prevented from spreading beyond the slit at least one of which is formed in the gimbal spring, when the slider is adhered with pushing force and, hence, the area on which the adhesive agent is applied is limited. As a result, even when the slider and the gimbal spring have different coefficients of linear expansion, the warping amount of the slider caused by a change in the temperature can be suppressed to lie within a predetermined range since the contact area is small between the slider and the gimbal spring, and the flying height of the slider can be stabilized.

In the magnetic head assembly according to the second aspect of the present invention, the adhesive agent adhering to the slider and the gimbal spring together exhibits a very small Young's modulus after it is hardened. Therefore, the warping amount of the slider is suppressed to a small value irrespective of a change in the temperature around the slider, and the flying height of the slider due to a change in the temperature can be stabilized.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Before describing the preferred embodiments, an explanation will be given of the conventional magnetic head assembly of a magnetic disk drive shown in FIGS. 1 to 5.

Figure 1:
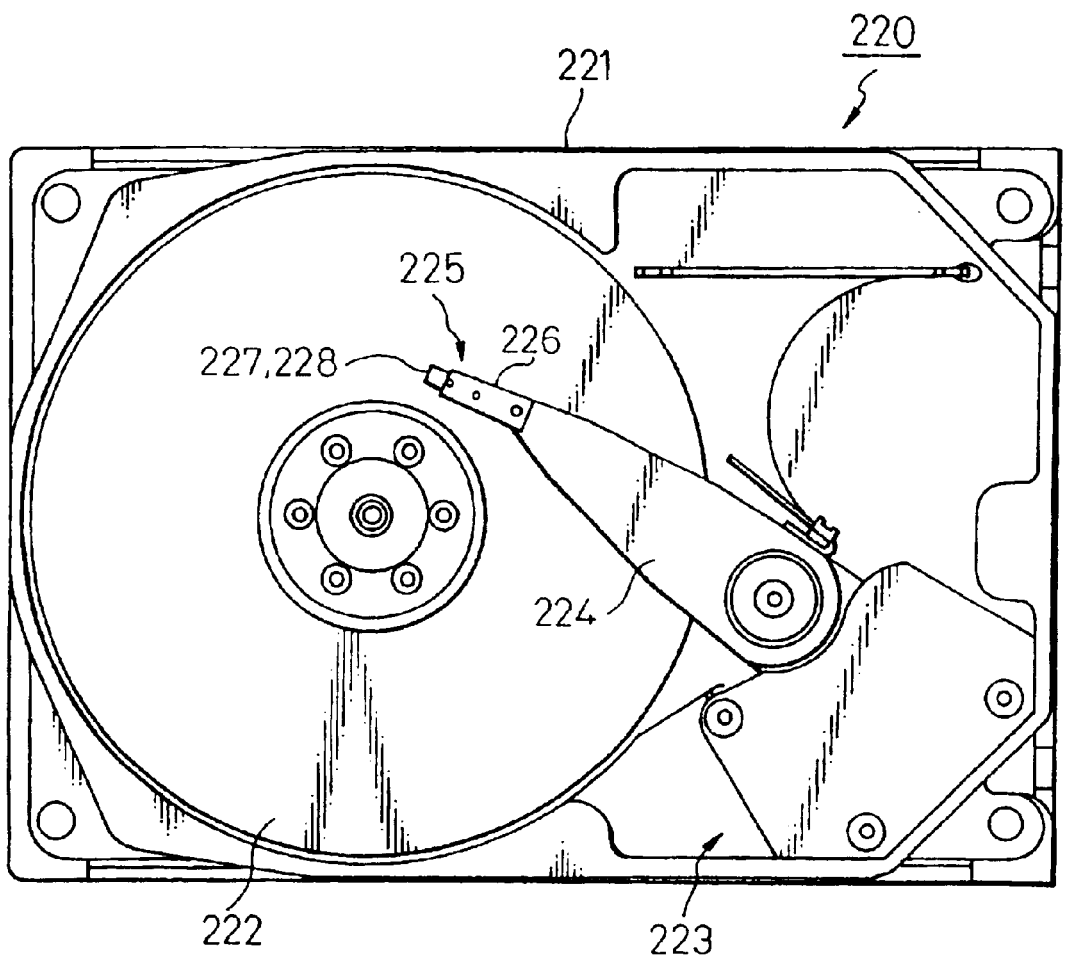
FIG. 1 is a plan view illustrating the whole constitution of a conventional magnetic disk drive.

FIG. 1 illustrates the constitution of a conventional magnetic disk drive 220 which includes a magnetic disk 222 of a diameter of, for example, 3.5 inches and a head-positioning actuator 223 that are contained in an enclosure 221. The actuator 223 is provided with a swing arm 224 which has a magnetic head assembly 225 mounted on a tip portion thereof. The magnetic head assembly 225 is constituted by a load beam 226 made of a stainless steel, a slider 227 in which a magnetic head is incorporated, and a gimbal spring 228 interposed between the slider 227 and the load beam 226.

Figure 2A:
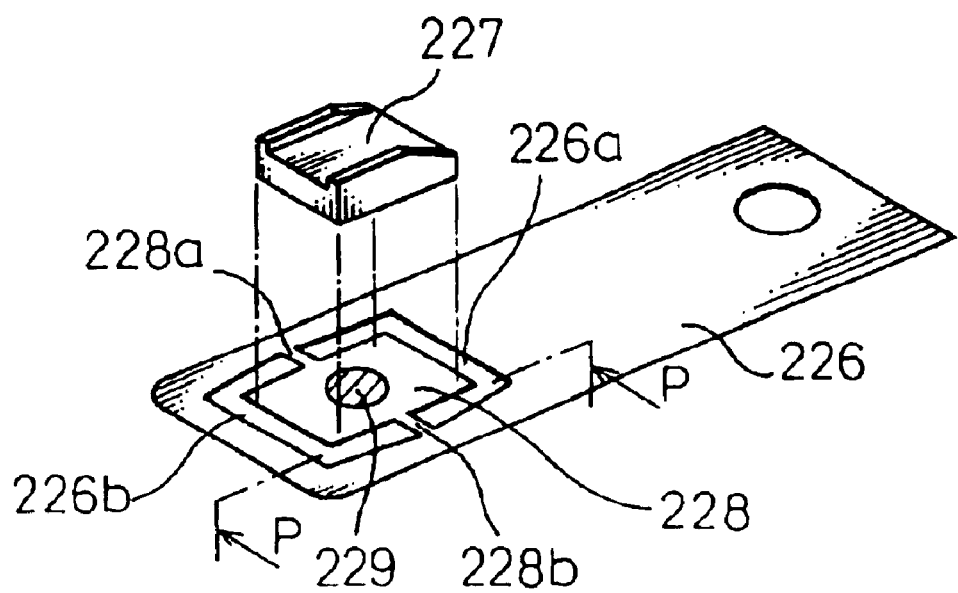
FIG. 2A is a perspective view of an assembly explaining how to mount a slider on a load beam shown in FIG. 1.

FIG. 2A illustrates the constitution of the magnetic head assembly 225 shown in FIG. 1. In this example, the gimbal spring 228 is provided in a tip portion of the load beam 226 integrally therewith. That is, the gimbal spring 228 is formed integrally with the load beam 226 being partitioned by two opposing U-shaped holes 226a and 226b that are formed in the tip portion of the load beam 226. A pair of beam portions 228a and 228b are formed between the opposing ends of the U-shaped holes 226a and 226b, and the gimbal spring 226 is supported by the load beam 226 via the pair of beam portions 228a and 228b.

Figure 2B:
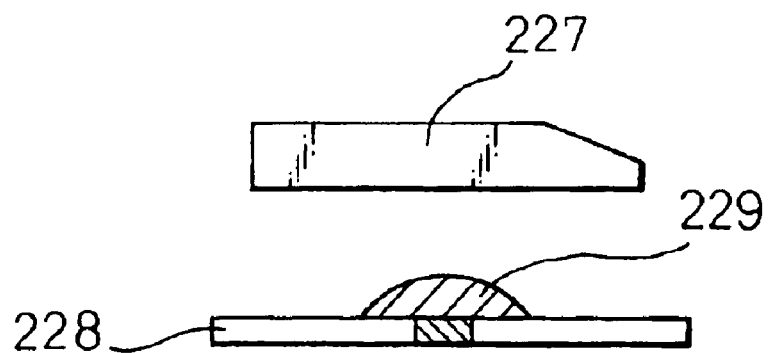
FIG. 2B is a sectional view along the line P—P in FIG. 2A.

The slider 227 is mounted on the gimbal spring 228 by using an adhesive agent 229. As shown in FIG. 2B, the adhesive agent 229 is permitted to drop from a dispenser that is not shown on the gimbal spring 228 and is applied thereto. The slider 227 is contacted to the gimbal spring 228 with a pushing force via the adhesive agent 229 and is mounted thereon.

Figure 3A:
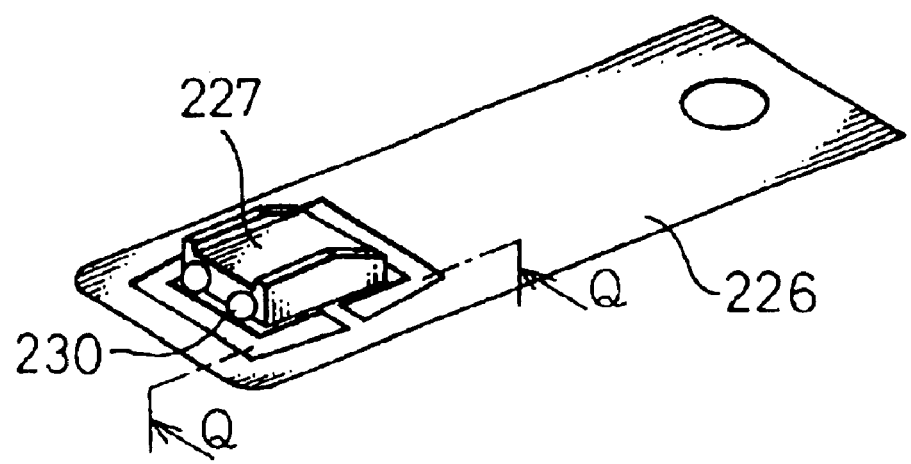
FIG. 3A is a perspective view illustrating the state where the slider of FIG. 2A is mounted on the load beam.
Figure 3B:
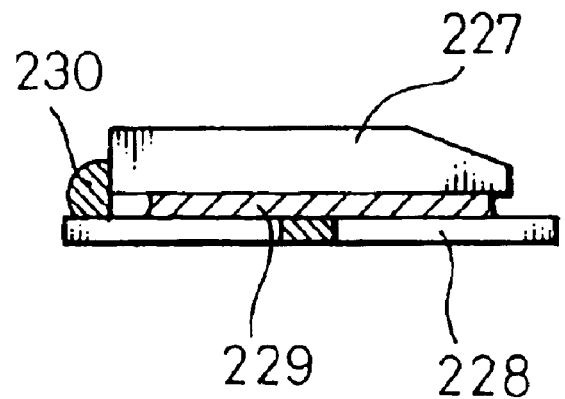
FIG. 3B is a sectional view along the line Q—Q in FIG. 3A.

FIGS. 3A and 3B illustrate a state where the slider 227 is mounted on the gimbal spring 228 in a manner as shown in FIGS. 2A and 2B. This example illustrates a case where a wiring pattern is formed on the gimbal spring 228 integrally therewith by a thin film-forming method or a similar method. A thin-film wiring pattern is formed on the gimbal spring 228 in order to electrically/mechanically connect the wiring pattern to the input/output terminals of the magnetic head of the slider 227. Moreover, the gold-ball bonding (hereinafter referred to as gold ball) 230 is applied to an end portion on the flow-out side of the slider 227.

However, as the slider 227 is realized in a small size, with the trend toward fabricating magnetic disk drives in a small size and in a light weight as well as toward realizing improved reliability, the adhesion area becomes very small between the slider 227 and the gimbal spring 228. The amount of the adhesive agent cannot be precisely controlled by the dispenser. When the adhesive agent 229 is applied in a large amount on a small adhesion area, therefore, the adhesive agent 229 applied onto the adhesion surface of the gimbal spring 227 spreads on the gimbal spring 228 when the slider 227 is mounted thereon with the application of pushing force. Then, the adhesion area of the slider 227 increases with respect to the gimbal spring 228, and the slider undergoes deformation accompanying a change in the temperature.

This problem will be described below in further detail.

Figure 4A:
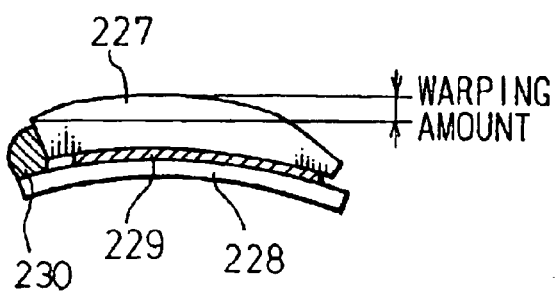
FIG. 4A is a diagram explaining an example of warping by the bimetal effect of a head assembly.
Figure 4B:
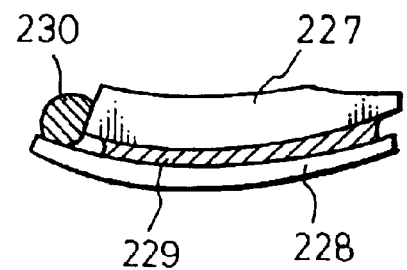
FIG. 4B is a diagram explaining another example of warping by the bimetal effect of the head assembly.

Described below is a case where the slider 227 is made, for example, of altic ($Al_2O_3TiC$) and the gimbal spring 228 is made, for example, of SUS, the two having large adhesion areas. In this case, when the temperature of the drive rises as it is being operated, the bimetal effect is exhibited due to a difference in the coefficient of linear expansion between the slider 227 and the gimbal spring 228, and the slider warps. When the gold ball 230 has been applied to the slider 227, furthermore, a change in the warping amount due to the bimetal effect becomes more conspicuous since the slider 227 and the gimbal spring 228 are locked together not only by the adhesive agent 229 but also by the gold ball 230. FIGS. 4A and 4B illustrate warping amounts due to the bimetal effect.

Figure 4C:
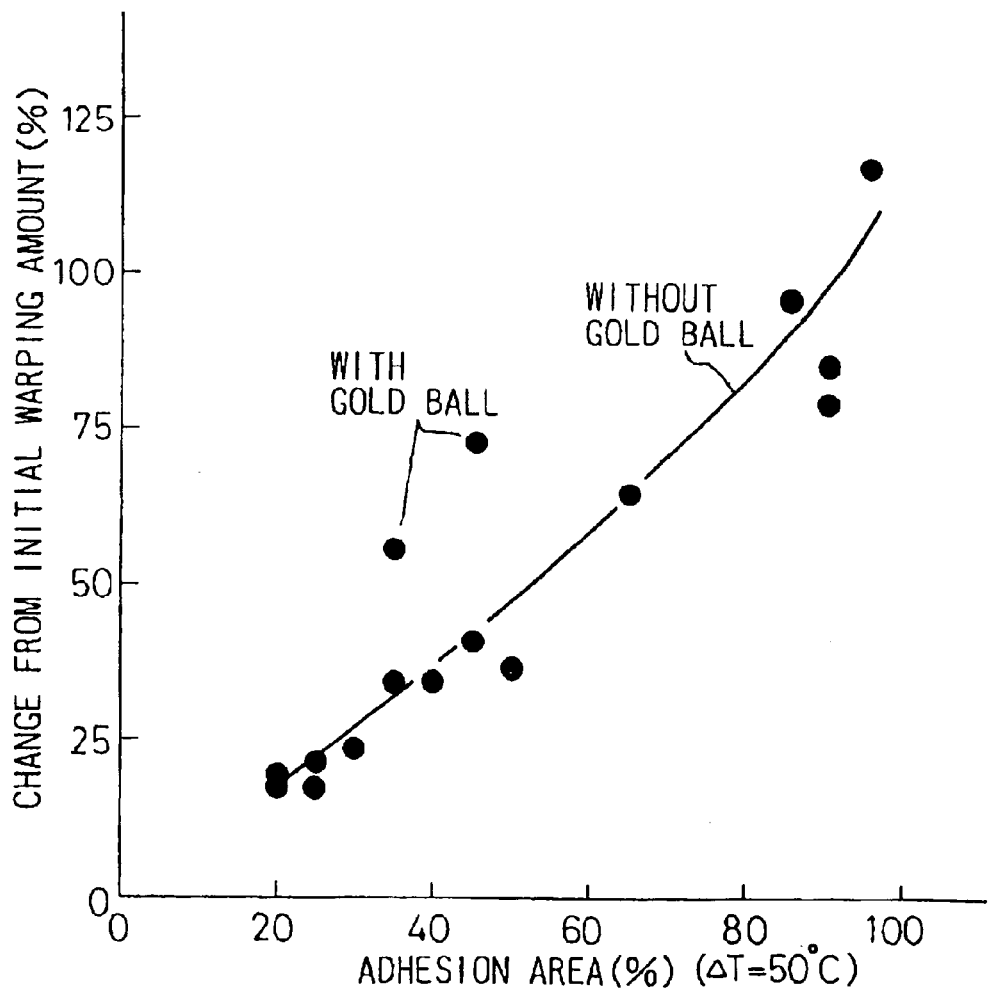
FIG. 4C is a diagram illustrating a relationship between the adhesion area and the initial warping amount of the slider.
Figure 5:
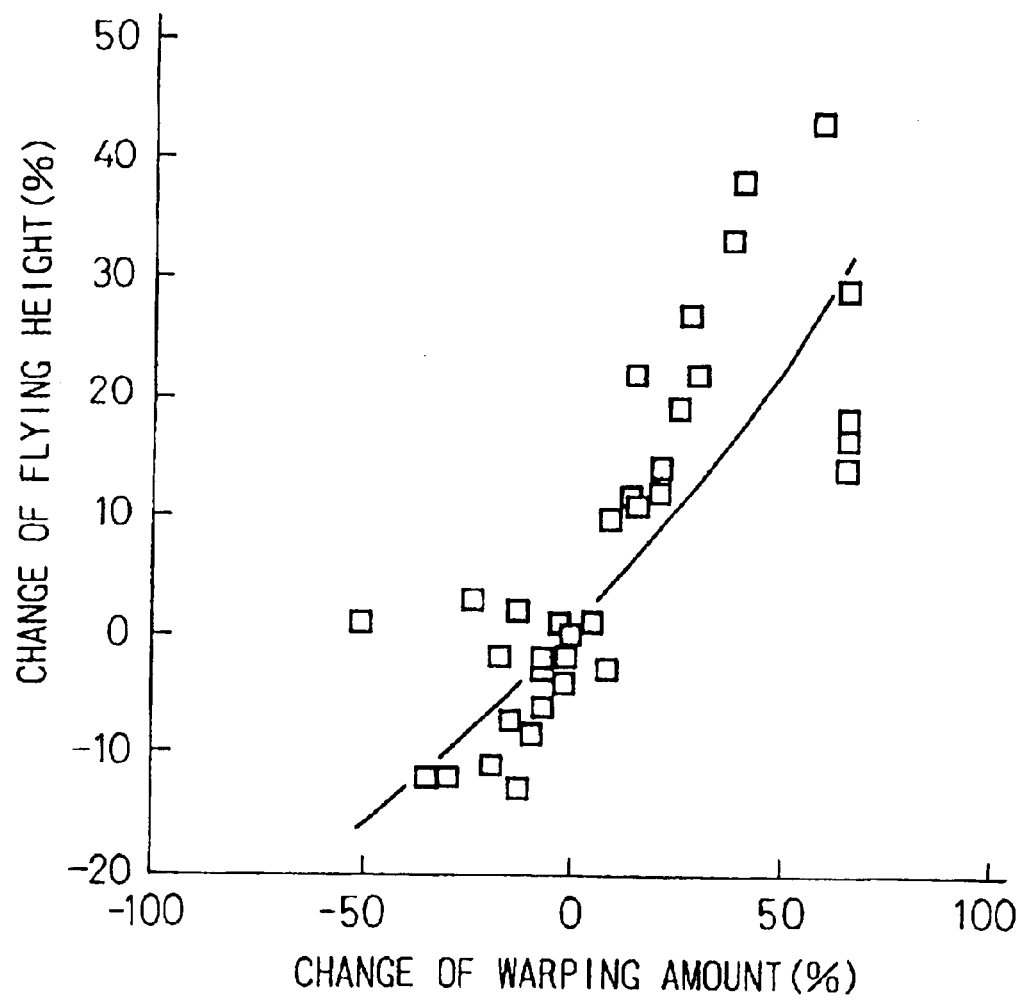
FIG. 5 is a diagram illustrating changes in the warping amount and in the flying height of the slider in the head assembly.

As shown in FIG. 4C, the warping amount varies depending upon the adhesion area between the slider 227 and the gimbal spring 228 and upon the presence or absence of the gold ball 230. A change in the warping amount and particularly in the warping amount in the lengthwise direction of the slider affects the flying heights at the flow-in end and flow-out end of the slider 227 as shown in FIG. 5. This adversely affects the reading of data or writing of data by the magnetic head. Accordingly, it is necessary to reduce the change in the warping amount of the slider caused by a change in the temperature.

Figure 6A:
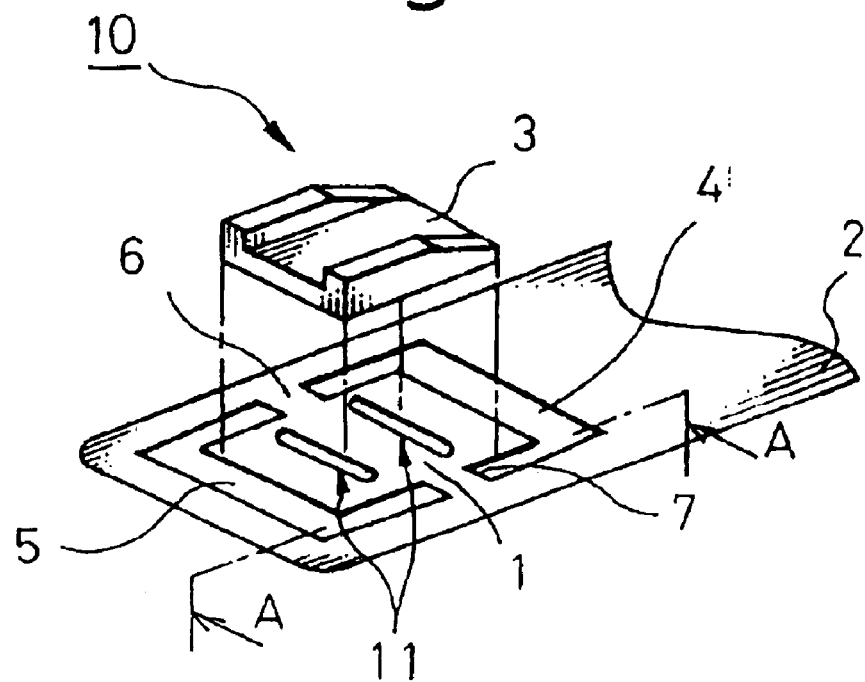
FIG. 6A is a perspective view of a fundamental constitution of the head assembly according to a first aspect.

FIG. 6A illustrates the constitution of the magnetic head assembly 10 according to a first aspect of the present invention. In this embodiment, the gimbal spring 1 is formed in a tip portion of the load beam 2 integrally therewith. That is, the gimbal spring 1 is formed in the load beam 2 integrally therewith being partitioned by two opposing U-shaped holes 4 and 5 that are formed in the tip portion of the load beam 2. The gimbal spring 1 is supported by the load beam 2 via a pair of beam portions 6 and 7 formed between the opposing ends of the U-shaped holes 4 and 5. Two slits 11 are formed in the gimbal spring 1 in such a manner as to divide the gimbal spring 1 into three equal portions in the axial direction of the load beam 2.

The two slits 11 work to control the adhesion area between the gimbal spring 1 and the slider 3 mounted on the gimbal spring 1. That is, the two slits 11 reduce a difference in the thermal expansion and contraction between the gimbal spring 1 and the slider 3 in the lengthwise direction of the slider and suppress the occurrence of the bimetal effect. Therefore, the slits 11 are arranged to be elongated in the transverse direction of the slider 3 that is adhered onto the gimbal spring 1 such that the adhesive agent-applied area of the gimbal spring 1 becomes smaller than the adhesion surface of the slider 3 against which it is opposed. This embodiment deals with the case where the gimbal spring 1 opposed to the adhesion surface of the slider 3 has an adhesion area which is larger than the adhesion area of the slider 3.

Figure 6B:
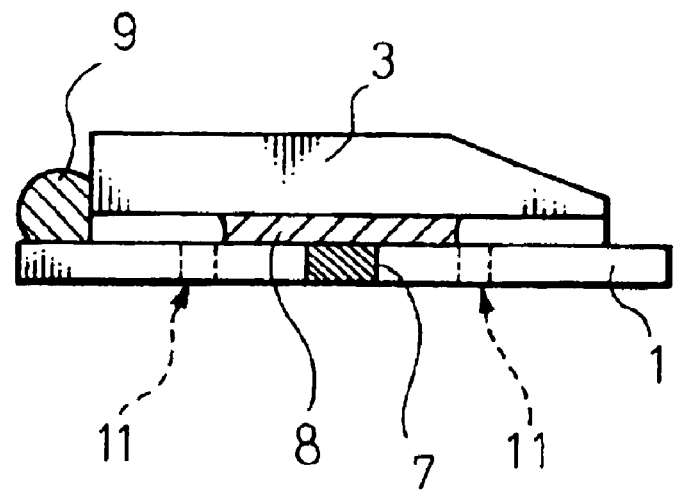
FIG. 6B is a sectional view along the line A—A of FIG. 6A.

An adhesive agent 8 is used for mounting the slider 3 on the gimbal spring 1. FIG. 6B is a sectional view of when the cross section of FIG. 6A along the line A—A is viewed from the direction of arrow. As shown in FIG. 6B, the adhesive agent 8 is applied by using a dispenser that is not shown onto a region between the two slits 11 formed in the gimbal spring 1, and the slider 3 is pushed onto the adhesive agent 8 and is mounted. FIG. 6B shows a gold ball 9 at an end of the slider 3. The gold ball 9 is necessary in the embodiments described later with reference to FIG. 14 and subsequent drawings, but is not particularly needed in the embodiments of from FIGS. 6A to 13B and is not described here in detail.

Figure 7:
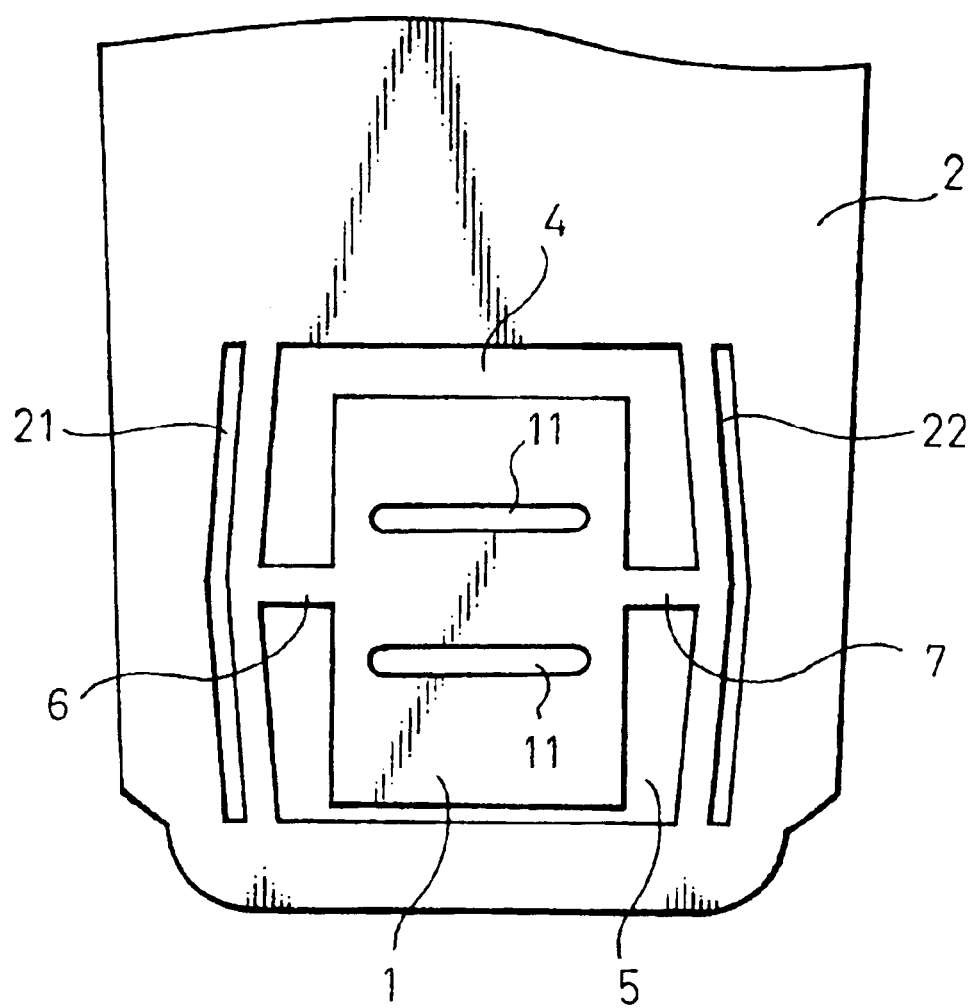
FIG. 7 is a plan view of a first embodiment of the shape of a slit according to the first aspect.

FIG. 7 is a plan view of the tip portion of the load beam 2 on an enlarged scale showing a first embodiment of the arrangement of slits 11 in the gimbal spring 1 that was explained with reference to FIGS. 6A and 6B. In this embodiment, the same constituent members as those of FIGS. 6A and 6B are denoted by the same reference numerals. That is, reference numeral 1 denotes the gimbal spring, 2 denotes the load beam, 4 and 5 denote U-shaped holes, and 6 and 7 denote the pair of beam portions. In this embodiment, V-shaped holes 21 and 22 are formed on the outsides of the opposing U-shaped holes 4 and 5, and the beam portions 6 and 7 are formed nearly in a T-shape. Both ends of the transverse bars of the nearly T-shaped beam portions 6 and 7 are connected to the load beam 2, and lower ends of longitudinal bars of T are connected to the gimbal spring 1. The nearly T-shaped beam portions 6 and 7 are formed such that the slider-mounting portion is reliably displaced in the rolling direction and in the pitching direction. This function has been described in detail in a prior application (U.S. Ser. No. 08/110,771) and is not described here in detail.

Figure 8:
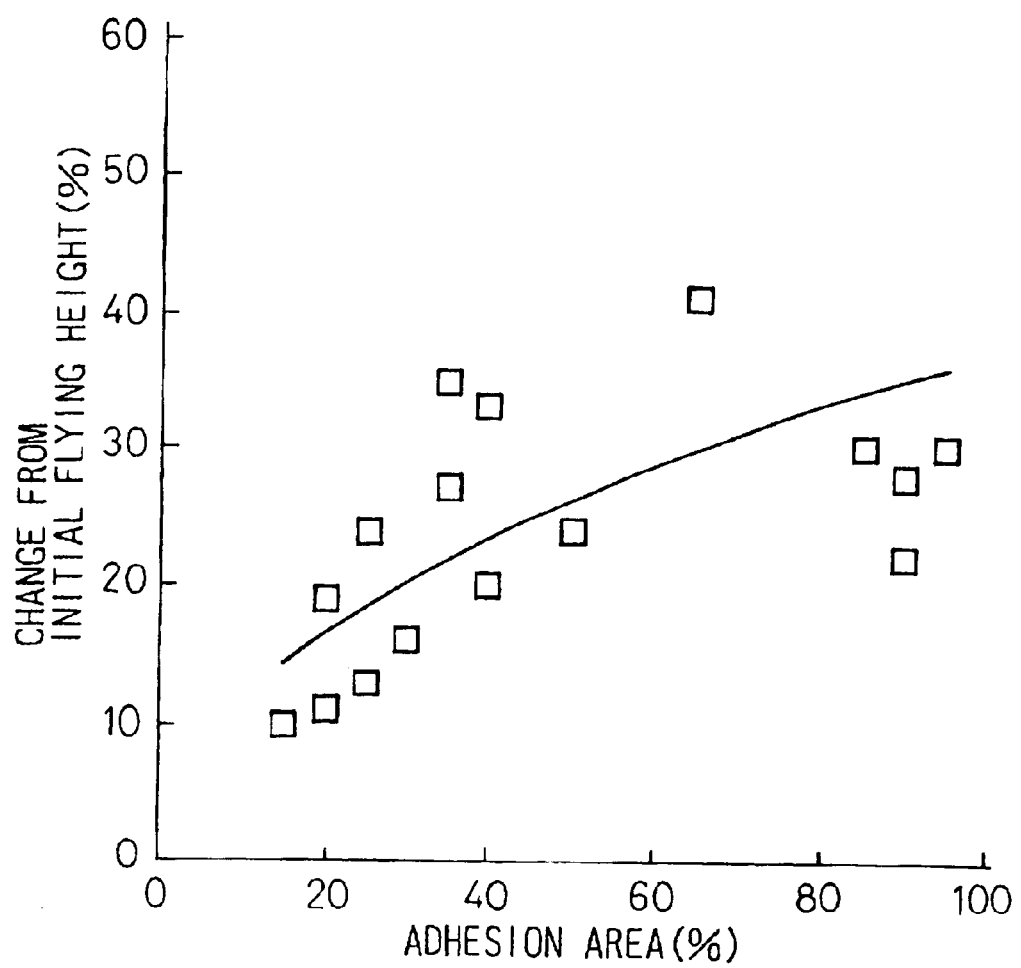
FIG. 8 is a diagram showing a relationship between the adhesion area of the slider and the initial flying height of the slider.

FIG. 8 is a diagram illustrating a relationship between the adhesion area of the slider 3 and a change from the initial flying height. From FIG. 8, it is desired that the areas of the two slits 11 formed in the gimbal spring 1 are smaller than 60% and, preferably, smaller than about 30% of a suitable bonding area between the slider 3 and the gimbal spring 1, e.g., of the adhesion area of the slider.

Even in the gimbal spring 1 shown in FIG. 7, the adhesive agent is dropwisely applied onto a region between the two slits 11 from the dispenser and, then, the slider 3 is contacted with a pushing force and is bonded to the gimbal spring 1. In this case, the adhesive agent spreads between the slider 3 and the gimbal spring 1. Even when the adhesive agent is applied in a large amount, however, the adhesive agent is prevented from spreading by the slits 11 and does not spread any more.

As the adhesive agent is hardened in this state, the adhesion area is suppressed to be small between the gimbal spring 1 and the slider 3. Even when the gimbal spring 1 and the slider 3 contract by different lengths due to a change in the temperature, this difference is reduced by the adhesive agent of a small area. As a result, no large change occurs in the warping amount of the slider 3.

Figure 9A:
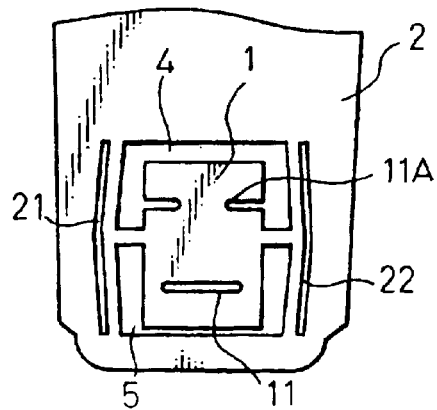
FIG. 9A is a diagram illustrating a second embodiment of the shape of a slit formed in the gimbal spring.
Figure 9B:
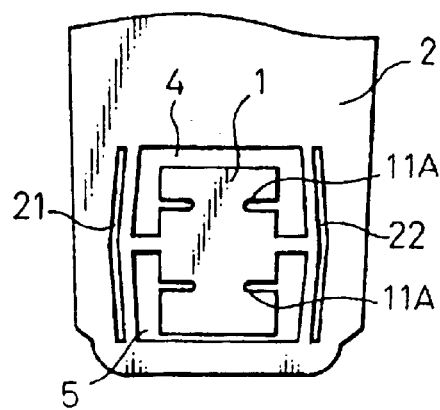
FIG. 9B is a diagram illustrating a third embodiment of the shape of a slit formed in the gimbal spring.
Figure 9C:
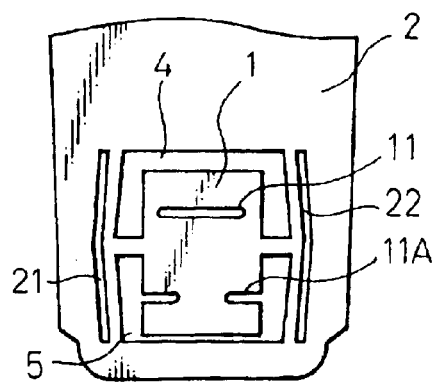
FIG. 9C is a diagram illustrating a fourth embodiment of the shape of a slit formed in the gimbal spring.
Figure 9D:
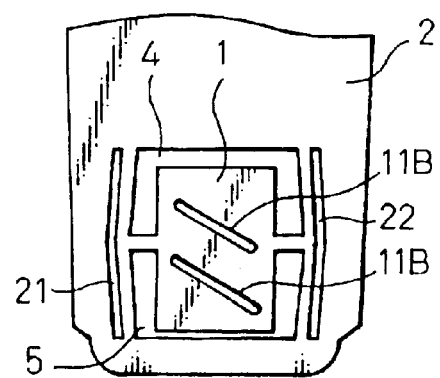
FIG. 9D is a diagram illustrating a fifth embodiment of the shape of a slit formed in the gimbal spring.
Figure 9E:
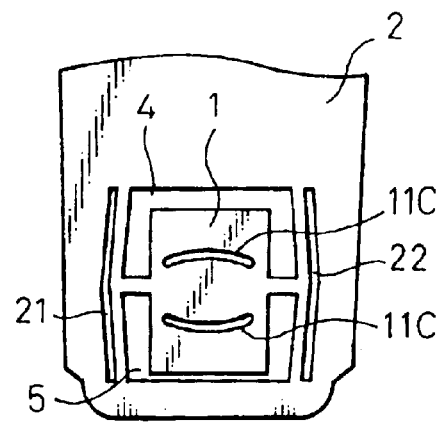
FIG. 9E is a diagram illustrating a sixth embodiment of the shape of a slit formed in the gimbal spring.
Figure 9F:
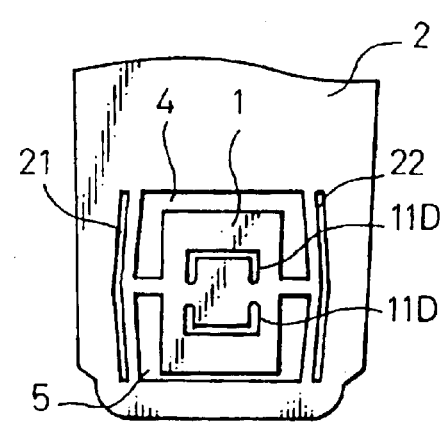
FIG. 9F is a diagram illustrating a seventh embodiment of the shape of a slit formed in the gimbal spring.
Figure 9G:
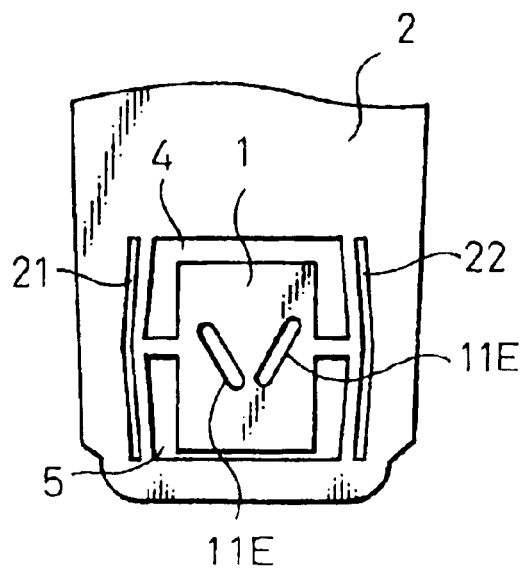
FIG. 9G is a diagram illustrating an eighth embodiment of the shape of a slit formed in the gimbal spring.
Figure 9H:
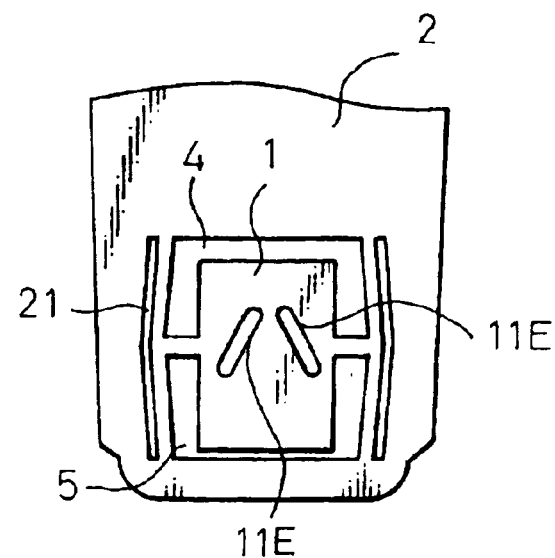
FIG. 9H is a diagram illustrating a ninth embodiment of the shape of a slit formed in the gimbal spring.
Figure 9I:
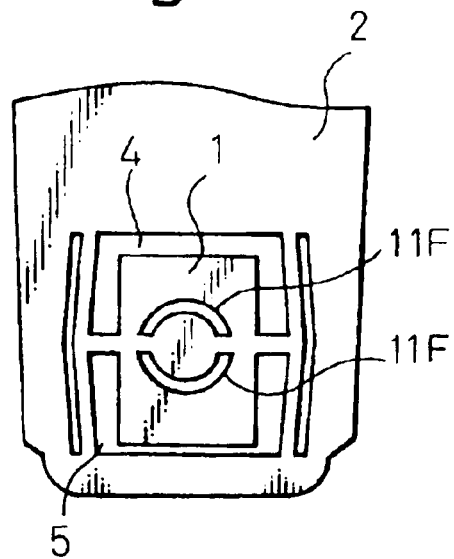
FIG. 9I is a diagram illustrating a tenth embodiment of the shape of a slit formed in the gimbal spring.
Figure 9J:
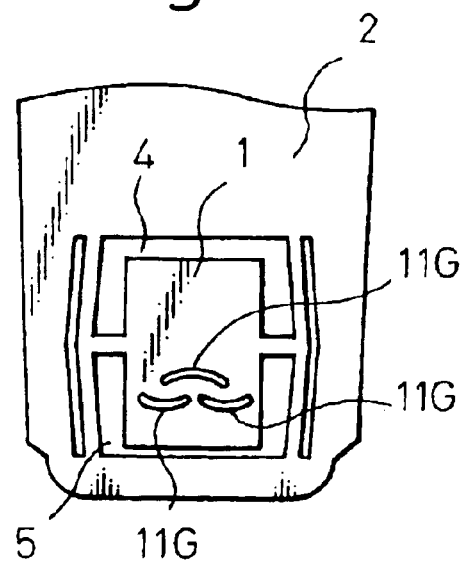
FIG. 9J is a diagram illustrating an eleventh embodiment of the shape of a slit formed in the gimbal spring.
Figure 9K:
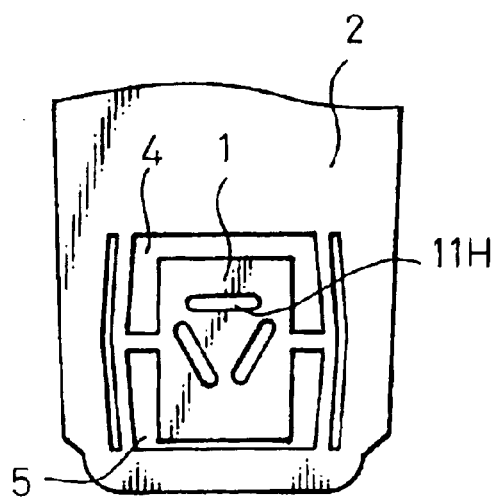
FIG. 9K is a diagram illustrating a twelfth embodiment of the shape of a slit formed in the gimbal spring.
Figure 9L:
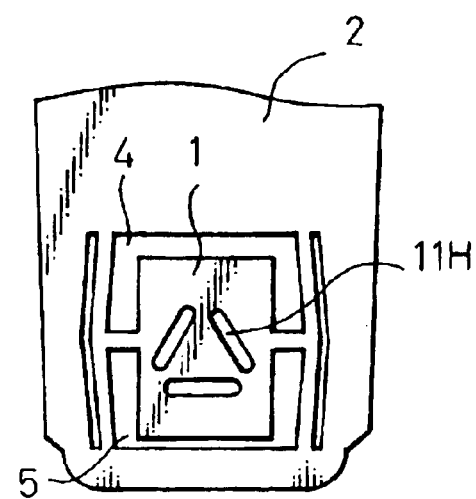
FIG. 9L is a diagram illustrating a thirteenth embodiment of the shape of a slit formed in the gimbal spring.
Figure 9M:
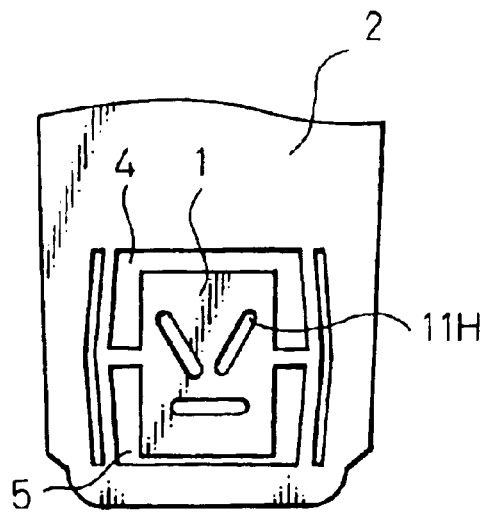
FIG. 9M is a diagram illustrating a fourteenth embodiment of the shape of a slit formed in the gimbal spring.
Figure 9N:
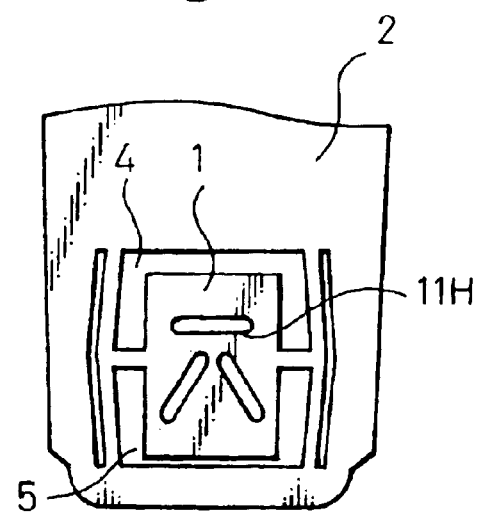
FIG. 9N is a diagram illustrating a fifteenth embodiment of the shape of a slit formed in the gimbal spring.

FIGS. 9A to 9N illustrate shapes of at least one slit 11 formed in the gimbal spring 1 of FIG. 7 according to second to fifteenth embodiments. The slit 11 need not be formed at a central portion of the gimbal spring 1 but may be so formed as to bite from the side portions of the gimbal spring 1. Moreover, the slit 11 need not be of a linear shape but may be folded at any point thereof or may be curved.

FIG. 9A illustrates an example in which a linear slit 11 is formed on the front side of the gimbal spring 1 and slits 11A are formed on the rear side of the gimbal spring 1 biting therein from the side ends thereof. FIG. 9B illustrates an example in which slits 11A are formed on both the front side and the rear side of the gimbal spring 1 biting therein from the side ends thereof. FIG. 9C illustrates an example in which a linear slit 11 is formed on the rear side of the gimbal spring 1 and slits 11A are formed on the front side of the gimbal spring 1 biting therein from the side ends thereof. FIG. 9D illustrates an example in which two parallel slits 11B are formed in the gimbal spring 1 running in an oblique direction. FIG. 9E illustrates an example in which two curved slits 11C are formed in the gimbal spring 1. FIG. 9F illustrates an example in which U-shaped slits 11D are formed in the gimbal spring 1 with their vertexes opposed to each other.

FIGS. 9G and 9H illustrate examples in which slits 11E are formed in the gimbal spring 1 being slanted in the back-and-forth direction. FIG. 9I illustrates an example in which semicircular slits 11F are formed being opposed to each other. FIG. 9J illustrates an example in which three short and arcuate slits 11G are formed. FIGS. 9K to 9N illustrate examples illustrating combinations of three short and linear slits 11H.

In the foregoing were described various arrangements of slits 11 formed in the gimbal spring 1. The slits 11, however, can be arranged in a variety of other ways in addition to the aforementioned embodiments, and the present invention is in no way limited to these embodiments only.

Figure 10A:
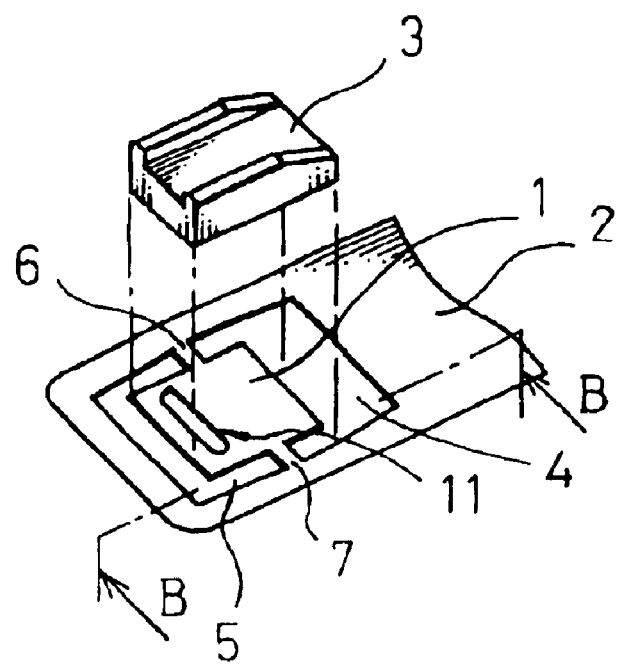
FIG. 10A is a perspective view illustrating a modified embodiment of the constitution of the head assembly according to the first aspect.
Figure 10B:
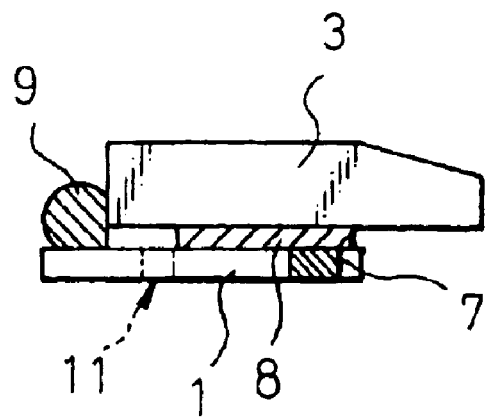
FIG. 10B is a sectional view along the line B—B of FIG. 10A.

FIG. 10A illustrates a constitution of the magnetic head assembly 10 which is a modification from the first embodiment of the present invention shown in FIG. 6A. Even in this embodiment, the gimbal spring 1 is formed in the load beam 2 integrally therewith being partitioned by two opposing U-shaped holes 4 and 5 formed in the tip portion of the load beam 2, and is supported by the load beam 2 via a pair of beam portions 6 and 7 formed between the opposing ends of the U-shaped holes 4 and 5. What makes this embodiment different from the embodiment of FIG. 6A is the size of the gimbal spring 1 with respect to the slider 3. In the embodiment of FIGS. 6A and 6B, the adhesion surface of the gimbal spring 1 opposing the adhesion surface of the slider has an area larger than the area of the adhesion surface of the slider 3. In the embodiment of FIGS. 10A and 10B, on the other hand, the area of the adhesion surface of the gimbal spring 1 opposing the adhesion surface of the slider 3 is smaller than the area of the adhesion surface of the slider 3. In this embodiment, furthermore, a slit 11 is formed in the gimbal spring 1 in a direction at right angles to the axial direction of the load beam 2.

In the case of this embodiment, the gimbal spring 1 is cut on the side of the base portion of load beam 2 with respect to the pair of beam portions 6 and 7. The gimbal spring 1 is cut roughly at a portion of the slit 11 on the side of the base portion of load beam 2 shown in FIG. 6A. FIG. 10B is a sectional view of when the cross section along the line B—B of FIG. 10A is viewed from the direction of arrow. The adhesive agent 8 is allowed to drop from the dispenser onto a region between the slit formed in the gimbal spring 1 and the end on the cut side of the gimbal spring 1 as shown in FIG. 10B. The slider 3 is contacted with a pushing force to the gimbal spring 1 via the adhesive agent 8 and is mounted thereon. FIG. 10B also shows the gold ball 9 at an end on the front side of the slider 3. As described earlier, however, the gold ball 9 is not particularly needed in this embodiment and is not described here in detail.

In this case, the area of the gimbal spring 1 on the cut side up to the slit 11 should be smaller than 60% (preferably, about 30%) of a suitable bonding area between the slider 3 and the gimbal spring 1, i.e., of the adhesion area of the slider. The adhesive agent 8 is dropwisely applied from the dispenser onto this portion and, then, the slider 3 and the gimbal spring 1 are bonded together. Though the adhesive agent 8 spreads between the slider 3 and the gimbal spring 1, spread of the adhesive agent 8 heading toward the slit 11 is blocked by the slit 11 and does not spread any more toward the front side. Accordingly, the adhesion area can be controlled by cutting the gimbal spring 1 with the slit 11 formed in the gimbal spring 1 as a boundary.

Figure 11A:
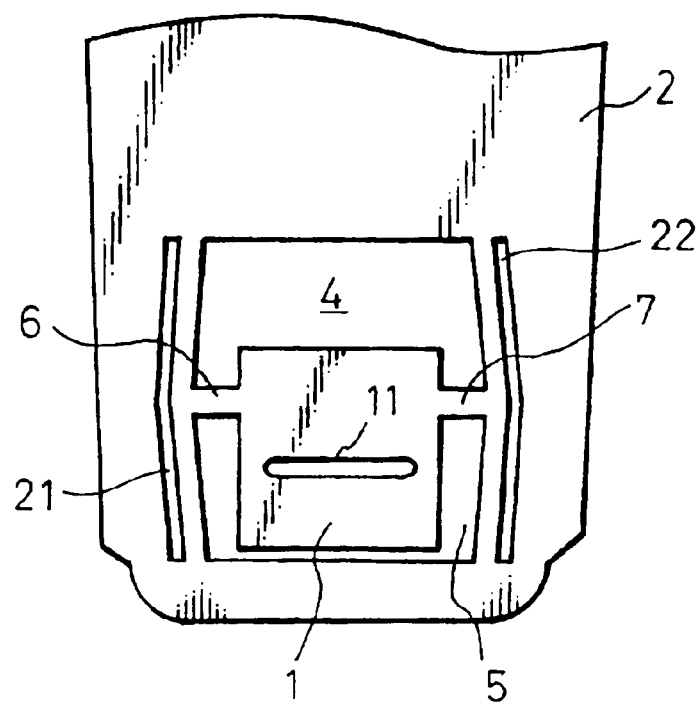
FIG. 11A is a diagram illustrating a shape of a slit which is a modification from the first embodiment of the first aspect.

FIG. 11A is a plan view of the tip portion of the load beam 2 on an enlarged scale illustrating an embodiment of the arrangement of the slit 11 in the gimbal spring 1 that is explained with reference to FIGS. 10A and 10B. In this embodiment, the same constituent members as those of FIGS. 10A and 10B are denoted by the same reference numerals. That is, reference numeral 1 denotes the gimbal spring, 2 denotes the load beam, 4 and 5 denote U-shaped holes, and 6 and 7 denote the pair of beam portions. Even in this embodiment, V-shaped holes 21, 22 are formed on the outsides of the opposing U-shaped holes 4 and 5, and the beam portions 6 and 7 are formed nearly in a T-shape. Both ends of the transverse bars of the nearly T-shaped beam portions 6 and 7 are connected to the load beam 2, and lower ends of longitudinal bars of T are connected to the gimbal spring 1. The nearly T-shaped beam portions 6 and 7 are formed such that the slider-mounting portion is reliably displaced in the rolling direction and in the pitching direction as described earlier.

Even in the gimbal spring 1 shown in FIG. 11A, the adhesive agent is dropwisely applied from the dispenser onto a portion of the gimbal spring 1 on the side of the base portion of load beam 2 up to the slit 11 and, then, the slider 3 is contacted with a pushing force and is bonded to the gimbal spring 1. In this case, the adhesive agent spreads between the slider 3 and the gimbal spring 1. Even when the adhesive agent is applied in a large amount, however, the adhesive agent is prevented from spreading at the position of slit 11 and does not spread any further.

As the adhesive agent is hardened in this state, the adhesion area is suppressed to be small between the gimbal spring 1 and the slider 3. Even when the gimbal spring 1 and the slider 3 contract by different lengths due to a change in the temperature, this difference does not effect each other. Therefore, no large change occurs in the warping amount of the slider 3.

FIGS. 11B to 11G illustrates shapes of at least one slit 11 formed in the gimbal spring 1 shown in FIG. 11A according to second to seventh embodiments. The slit 11 needs not be formed at the central portion of the gimbal spring 1 but may be formed to bite into the gimbal spring 1 from the side edges thereof. Moreover, the slit 11 needs not be of a linear shape but may be folded at anywhere thereof or may be curved.

Figure 11B:
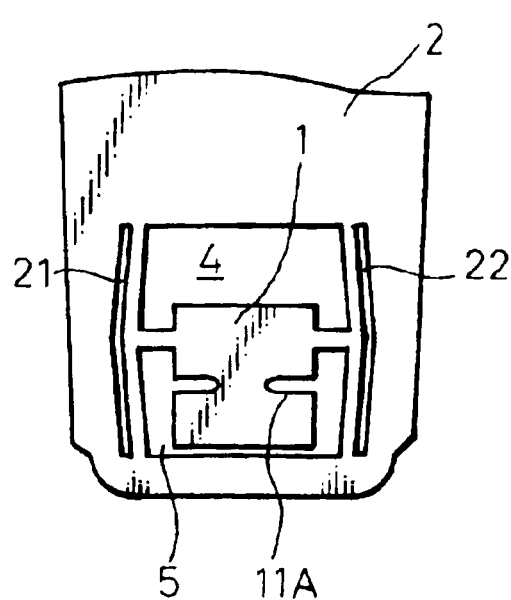
FIG. 11B is a diagram illustrating a shape of a slit which is a modification from the second embodiment of the first aspect.
Figure 11C:
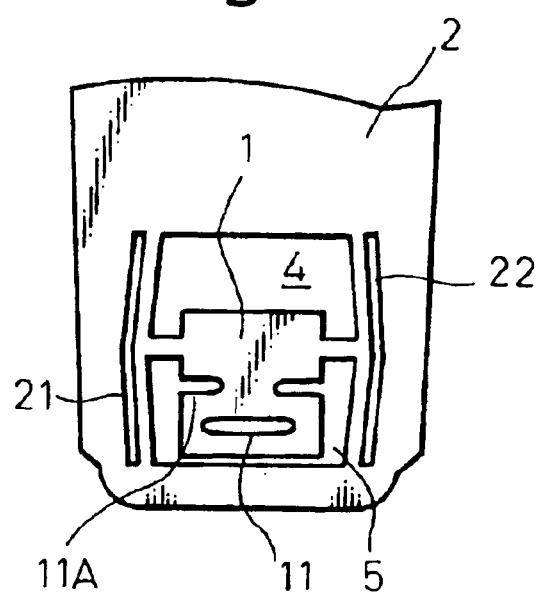
FIG. 11C is a diagram illustrating a shape of a slit which is a modification from the third embodiment of the first aspect.
Figure 11D:
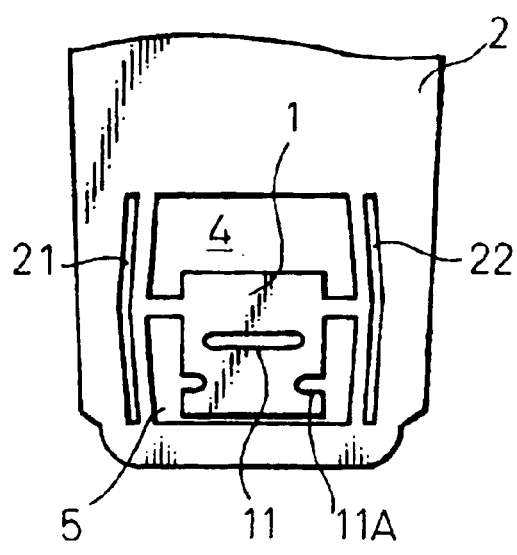
FIG. 11D is a diagram illustrating a shape of a slit which is a modification from the fourth embodiment of the first aspect.
Figure 11E:
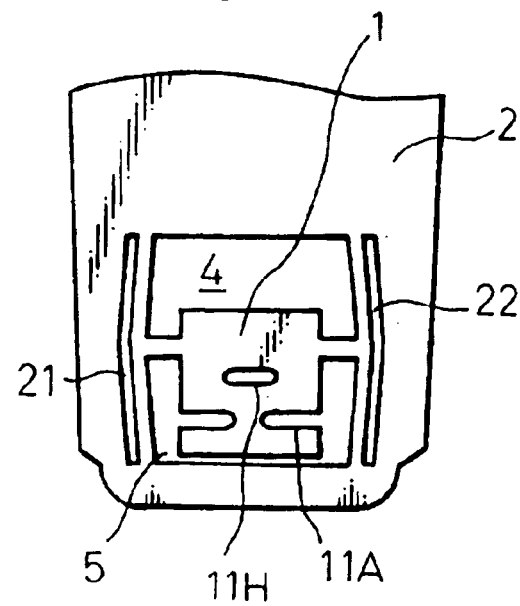
FIG. 11E is a diagram illustrating a shape of a slit which is a modification from the fifth embodiment of the first aspect.
Figure 11F:
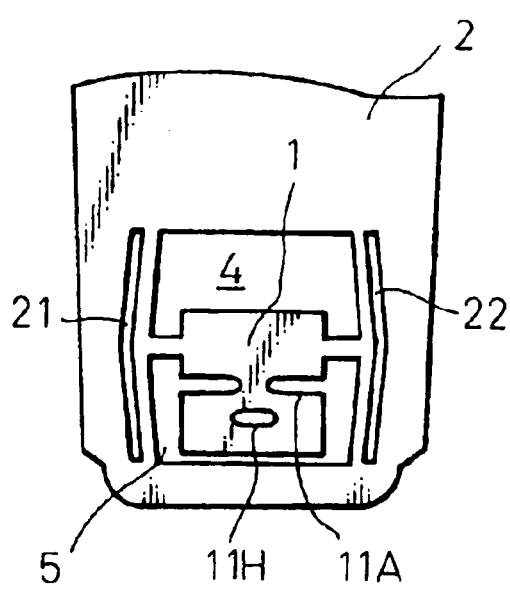
FIG. 11F is a diagram illustrating a shape of a slit which is a modification from the sixth embodiment of the first aspect.
Figure 11G:
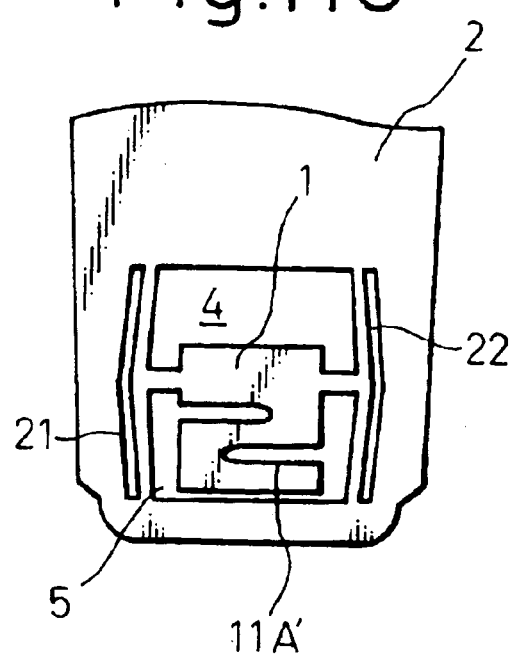
FIG. 11G is a diagram illustrating a shape of a slit which is a modification from the seventh embodiment of the first aspect.

FIG. 11B illustrates an example in which slits 11A are formed biting into the gimbal spring 1 from the side ends thereof. FIG. 11C illustrates an example in which a linear slit 11 is formed on the front side of the gimbal spring 1 in addition to slits 11A of FIG. 11B. FIGS. 11C to 11G illustrate a variety of examples in which two slits 11 are formed in the gimbal spring 1. FIG. 11D illustrates an example in which slits 11A are formed biting on the front side in addition to the slit 11 of FIG. 11A. FIG. 11E illustrates an example having a linear and short slit 11H which is a linear and long slit 11 of FIG. 11D and slits 11A that deeply bite into the gimbal spring 1 from side ends thereof on the front side. FIG. 11F illustrates an example in which the slits 11A and 11H are arranged in a manner opposite to FIG. 11E, and FIG. 11G illustrates an example in which two long slits 11A' are formed biting deeply from the side edges thereof nearly to the opposite side edges thereof.

In any one of the above-mentioned embodiments, the adhesion area between the slider 3 and the gimbal spring 1 can be controlled by cutting the gimbal spring 1 by an area which is smaller than 60% of a suitable bonding area between the slider 3 and the gimbal spring 1, i.e., smaller than 60% of the adhesion area of the slider with the slide 11 in the gimbal spring 1 on the side of the load beam 2 as a boundary. This makes it possible to reduce a difference in the expansion or contraction caused by the thermal expansion of the slider 3 and the gimbal spring 1. The adhesion area between the slider 3 and the gimbal spring 1 can be further controlled by bringing the position of the slit toward the cut side in a state where the gimbal spring 1 is cut.

Figure 12A:
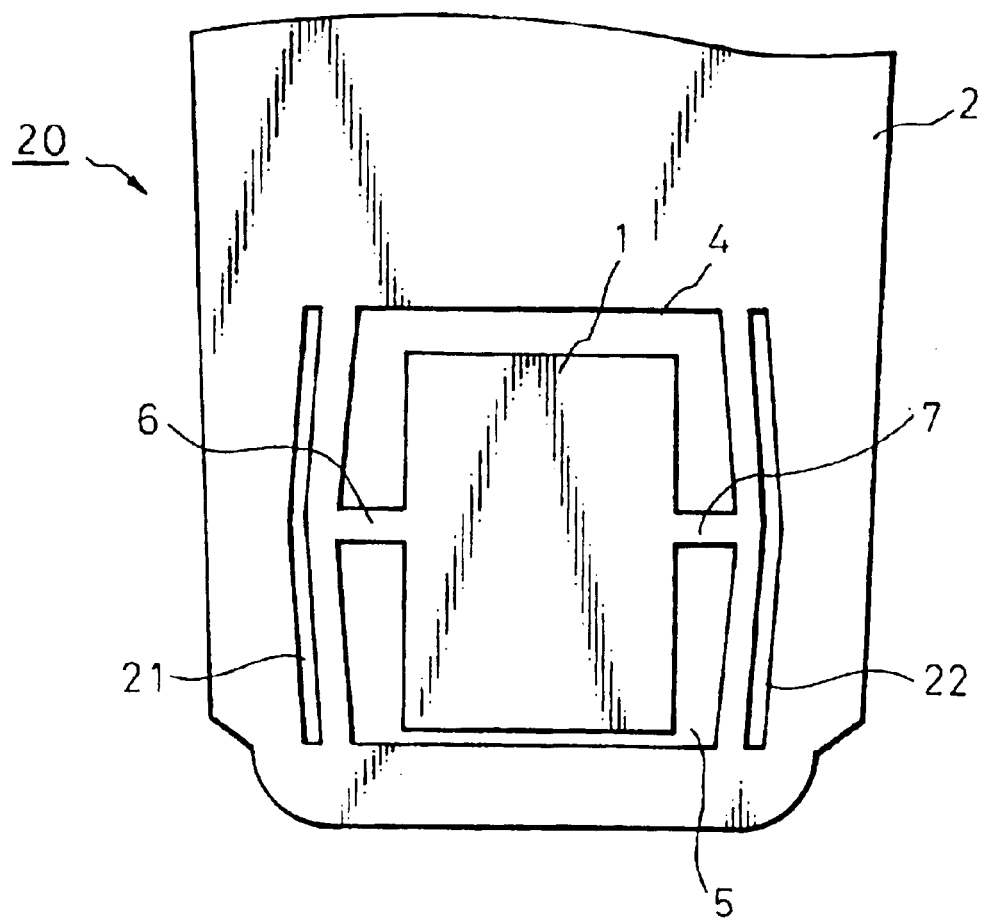
FIG. 12A is a plan view of the load beam in the head assembly according to a second aspect.
Figure 12B:
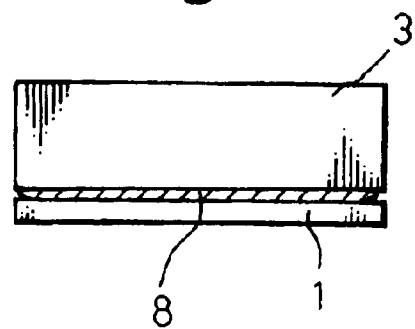
FIG. 12B is a side view illustrating the state where the adhesive agent is applied between the gimbal spring and the head of FIG. 12A.

FIGS. 12A and 12B illustrate a magnetic head assembly 20 of an embodiment according to the second aspect of the present invention, wherein FIG. 12A illustrates the constitution of the gimbal spring 1 and the load beam 2 of the second aspect. Even in this embodiment, the same constituent members as those of FIGS. 6A and 6B are denoted by the same reference numerals. That is, reference numeral 1 denotes the gimbal spring, 2 denotes the load beam, 4 and 5 denote U-shaped holes, and 6 and 7 denote the pair of beam portions. Even in this embodiment, V-shaped holes are formed on the outsides of the opposing U-shaped holes 4 and 5, and the beam portions 6 and 7 are formed nearly in a T-shape. Both ends of the transverse bars of the nearly T-shaped beam portions 6 and 7 are connected to the load beam 2, and lower ends of longitudinal bars of T are connected to the gimbal spring 1. The nearly T-shaped beam portions 6 and 7 are formed such that the slider-mounting portion is reliably displaced in the rolling direction and in the pitching direction as described earlier.

In this embodiment, the slider 3 is made of generally used $Al_2O_3TiC$ and the gimbal spring 1 is made of generally used SUS. In order to fasten them together, this embodiment uses an adhesive agent which after hardened exhibits a Young's modulus of, for example, about $9.8 \times 10^3$ $mN/mm^2$. As shown in FIG. 12B, the adhesive agent is applied between the head 3 and the gimbal spring 1. The thickness of the adhesive agent 8 is about 5 $\mu m$ when they are fastened together. The slider 3 that is used has a length of about 2 mm, a width of 1.6 mm and a thickness of 0.43 mm.

On the other hand, there has heretofore been used an adhesive agent 8 which after hardening exhibits a Young's modulus of about $9.8 \times 10^4$ $mN/mm^2$ for the combination of the gimbal spring 1 and the slider 3 of the same sizes and of the same materials.

By using the adhesive agent used in the second aspect of the present invention and the conventional adhesive agent, the warping amount of the slider was simulated under the conditions in which the temperature of the magnetic disk drive was changed by 50° C., and the following results were obtained.

(1) The warping amount was 43 nm when there was used the adhesive agent which after hardened exhibited a Young's modulus of $9.8 \times 10^4$ $mN/mm^2$.

(2) The warping amount was 6 nm when there was used the adhesive agent which after hardened exhibited a Young's modulus of $9.8 \times 10^3$ $mN/mm^2$.

Here, a change in the temperature was set to be 50° C. to represent a difference between normal temperature and a maximum temperature for which the magnetic disk drive is guaranteed. Moreover, the warping amount is defined to be a difference between a height at a central position of the slider 3 and a height at the slider edge.

Figure 13A:
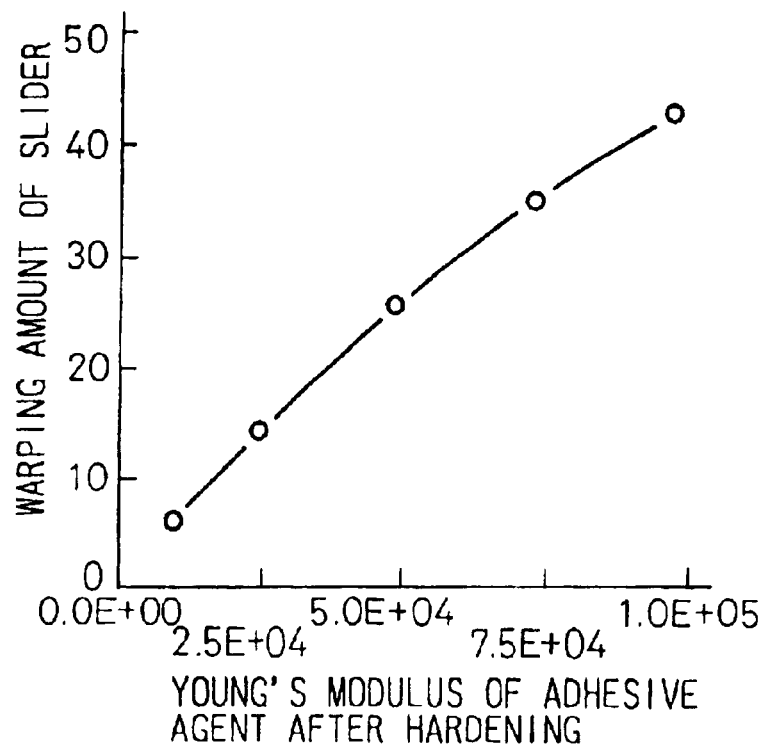
FIG. 13A is a diagram of characteristics showing Young's modulus after hardening of the adhesive agent used in the second aspect of the present invention and warping amount of the slider.
Figure 13B:
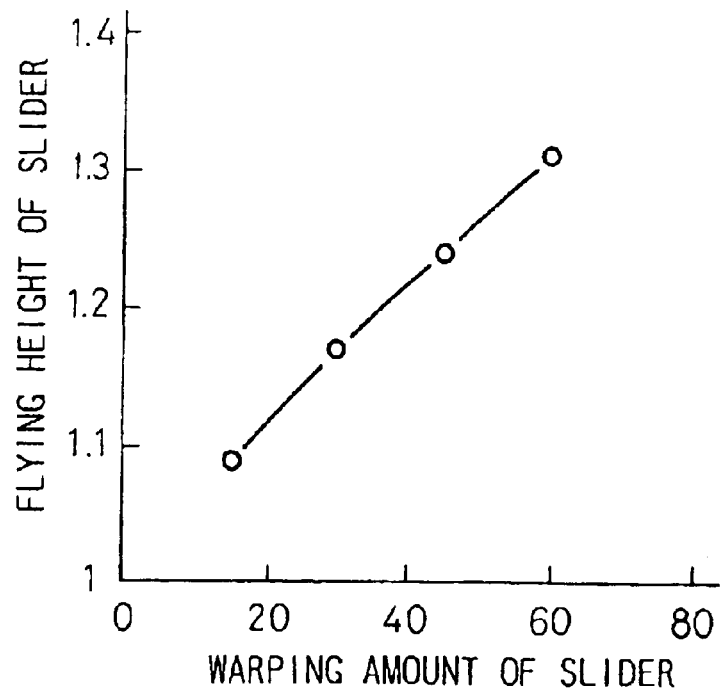
FIG. 13B is a diagram of characteristics showing a relationship between the warping amount of the slider and the flying height of the slider.

FIG. 13A is a diagram illustrating the simulated results of changes in the warping amount of the slider with the Young's modulus of the adhesive agent after hardening as a parameter, and FIG. 13B is a diagram illustrating the simulated results of changes in the flying height of the slider with the warping amount on the rail surface of the slider as a parameter. It will be understood from these drawings that the warping amount of the slider increases with an increase in the Young's modulus of the adhesive agent after hardened, i.e., warping of the slider is very much dependent upon the Young's modulus of the adhesive agent after hardening. It will further be understood that the flying height of the slider is very much dependent upon the warping of the slider.

From the standpoint of reading and writing characteristics of the magnetic head and of designing floating performance maintaining reliability, a change in the flying height must be suppressed to be within 5% when the temperature of the slider has changed. For this purpose, the warping amount of the slider must be suppressed to be within 10 nm from FIG. 13B. From FIG. 13A, furthermore, the slider and the gimbal spring must be fastened together by using the adhesive agent which after hardening exhibits a Young's modulus of not larger than $1.6 \times 10^4$ mN/mm$^2$ in order to suppress the warping amount of the slider within 10 nm. This value is about 1/13000 of the Young's modulus of SUS forming the gimbal spring which is smaller than the Young's modulus of altic which forms the slider.

Thus, by selecting the Young's modulus of the adhesive agent after hardening to be smaller than about 1/13000 the Young's modulus of the slider material or the gimbal spring material whichever is smaller, the warping amount of the slider can be suppressed to be smaller than a desired value of about 10 nm, and a change in the flying height of the slider can be suppressed to be within 5%.

By selecting the slider material and the gimbal spring material having nearly the same coefficient of linear expansion, furthermore, the slider is prevented from warping despite the fact that the temperature is changed. In general, the material of the gimbal spring must have resiliency and, hence, SUS or the like is usually used. By taking the coefficient of linear expansion of SUS into account, therefore, zirconia or the like is suitable for forming the slider.

Figure 14:
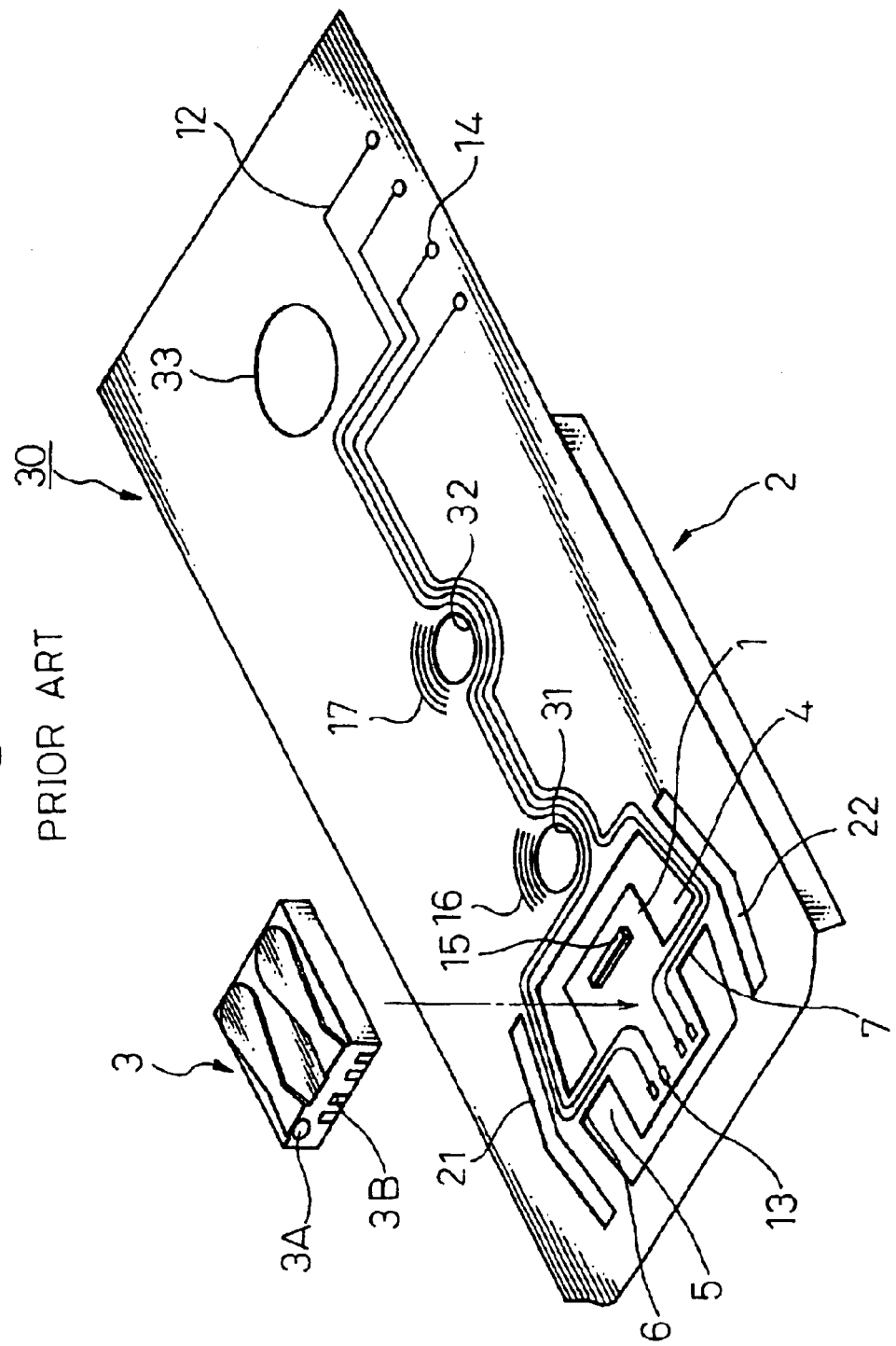
FIG. 14 is a perspective view illustrating the constitution of the existing head assembly to which the present invention is adapted.

FIG. 14 illustrates the constitution of a magnetic head assembly 30 disclosed in Japanese Patent Application No. 82110/1993 (U.S. Ser. No. 08/110,771). Even in this constitution, the same constituent members as those of the aforementioned embodiment are denoted by the same reference numerals. That is, reference numeral 1 denotes the gimbal spring, 2 denotes the load beam, 3 denotes the slider, 4 and 5 denote U-shaped holes, and 6 and 7 denote the pair of beam portions. Even in this embodiment, V-shaped holes are formed on the outsides of the opposing U-shaped holes 4 and 5, and the beam portions 6 and 7 are formed nearly in a T-shape. Both ends of the transverse bars of the nearly T-shaped beam portions 6 and 7 are connected to the load beam 2, and lower ends of longitudinal bars of T are connected to the gimbal spring 1. The nearly T-shaped beam portions 6 and 7 are formed such that the slider-mounting portion is reliably displaced in the rolling direction and in the pitching direction as described earlier. In this constitution, furthermore, reference numerals 31 and 32 denote holes for mounting jigs, and 33 denote a hole for fastening the load beam 2.

What makes the magnetic head assembly 30 of this constitution different from the above-mentioned magnetic head assembles 10 and 20 is that a wiring pattern 12 is formed on the surface of the load beam 2. The wiring pattern 12 is provided to take out signals from the magnetic head 3A provided in the slider 3. One end of the wiring pattern 12 is connected to terminals 13 provided at an end of the gimbal spring 1 and the other end thereof is connected to output terminals 14 provided near the base portion of the load beam 2. The wiring pattern 12 runs from the connection terminals 13 onto the load beam 2 passing through the beam portions 6 and 7, and arrives at the output terminals 14 detouring the holes 31 and 32.

The connection terminals 13 provided at the end of the gimbal spring 1 correspond to terminals 3B provided at an end of the slider 3, and are made contiguous to the terminals 3B when the slider 3 is mounted on the gimbal spring 1. In a state in which the slider 3 is mounted on the gimbal spring 1, the terminals 3B of the slider and the connection terminals on the gimbal spring 1 are connected together by the gold ball 9 shown in FIG. 6B.

The wiring pattern 12 is formed by, for example, patterning a plated thin copper film by photolithography, and has a thickness of about 5 μm and a width of about 50 μm. The thickness and width of the wiring pattern are determined by the resistance of the conductor pattern and by the capacity of the load beam 2.

With the wiring pattern 12 being formed on the tip portion of the gimbal spring 1, the slider 3 mounted on the gimbal spring 1 is tilted by the thickness of the wiring pattern 12. In order to prevent this, in general, a dummy thin-film pattern 15 having the same height as the wiring pattern 12 is formed on the rear end side of the gimbal spring 1. Even around the holes 31 and 32 of the load beam 2, dummy patterns 16 and 17 are formed symmetrically to the wiring pattern 12 in order to maintain balance in the mechanical strength in the direction of width of the load beam 2.

Described below is an example in which the present invention is adapted to the thus constituted magnetic head assembly 30.

Figure 15:
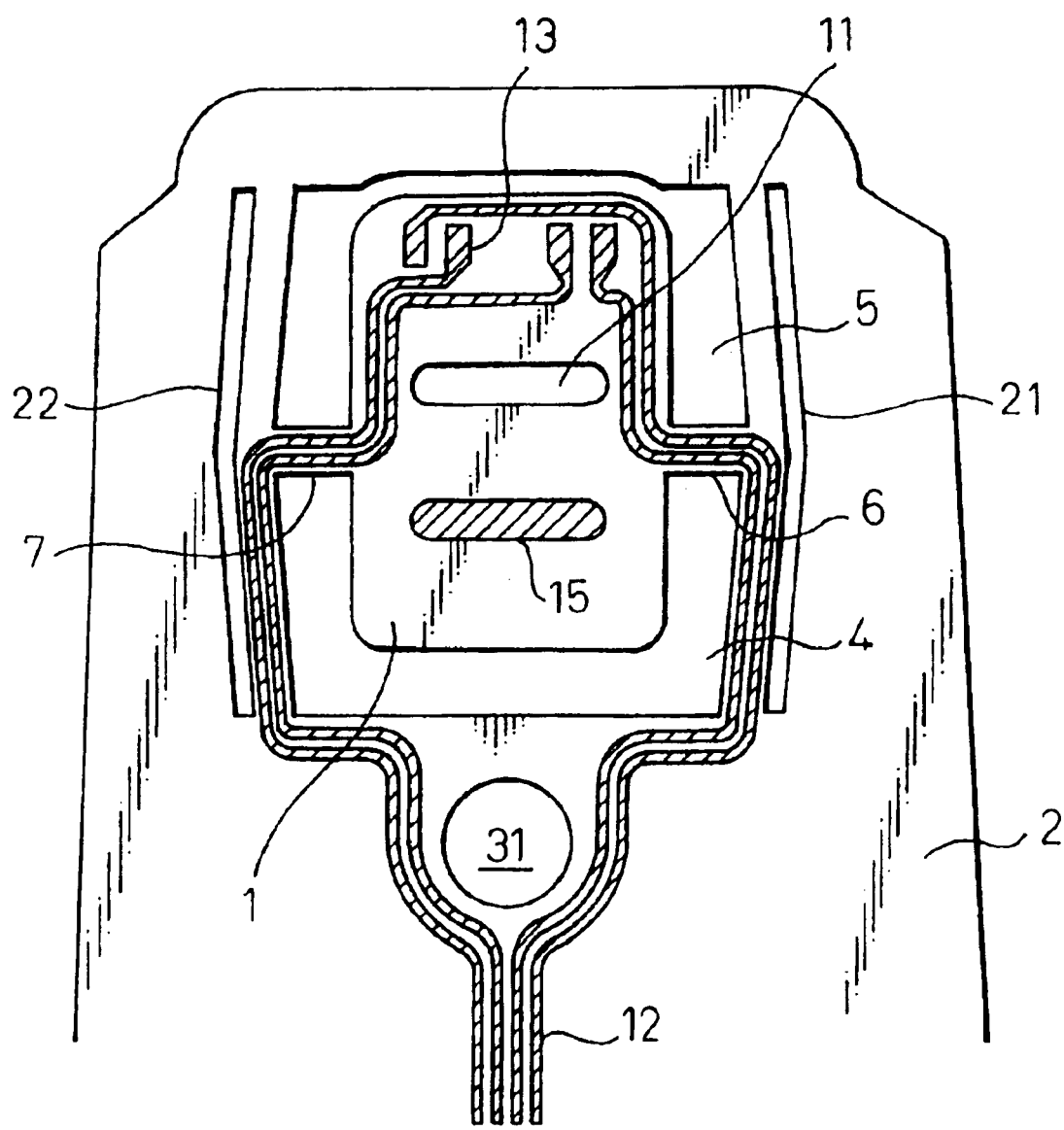
FIG. 15 is a diagram illustrating a first example in which the first aspect of the present invention is adapted to the head assembly of FIG. 14.

FIG. 15 is a plan view illustrating, on an enlarged scale, major portions of the gimbal spring 1 and of the load beam 2 of FIG. 14. The same constituent members as those of FIG. 14 are denoted by the same reference numerals. In the embodiment of FIG. 15, a slit 11 is formed in a region between the wiring pattern 12 and the dummy thin-film pattern 15 formed on the gimbal spring 1. In this case, the adhesive agent is permitted to drop from the dispenser onto the region between the slit 11 and the dummy thin-film pattern 15. When the slider 3 is mounted, therefore, the adhesive agent is restricted from spreading by the slit 11 and by the dummy thin-film pattern 15.

In the magnetic head assembly of this embodiment, the slider 3 is adhered to the gimbal spring 1 with the adhesive agent 8, and the terminals 3B of the slider and the connection terminals on the gimbal spring 1 are connected together by the gold ball 9 shown in FIG. 6B in a state in which the slider 3 is mounted on the gimbal spring 1. In the magnetic head assembly of this embodiment, therefore, the slider 3 and the gimbal spring 1 are locked at two points by the gold ball 9 and by the adhesive agent 8. In this embodiment, however, a slit 11 exists between the portion bonded by the gold ball 9 and the portion bonded by the adhesive agent 8. This helps reduce the difference in the expansion or contraction due to thermal expansion between the slider 3 and the gimbal spring 1 and reduce the effect by two locking points based upon the gold ball and the adhesive agent. As a result, the slider warps a small amount with a change in the temperature.

Figure 16:
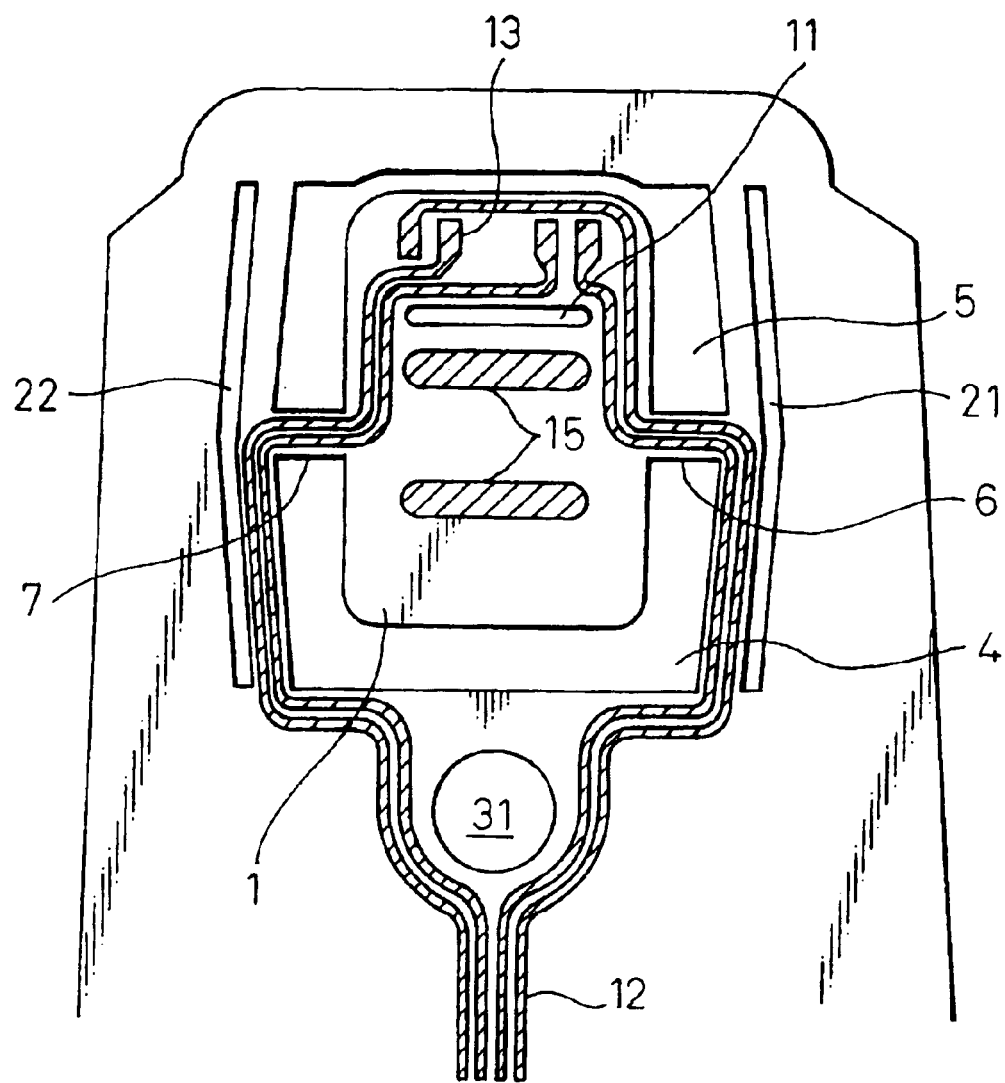
FIG. 16 is a diagram illustrating a second example in which the first aspect of the present invention is adapted to the head assembly of FIG. 14.

FIG. 16 illustrates a modified example of the embodiment of FIG. 15, and wherein dummy thin-film patterns 15 are provided on both sides of a portion of the gimbal spring 1 on which the adhesive agent will be dropped. In this case, a slit 11 is formed between the wiring pattern 12 and the dummy thin-film pattern 15 of the side close to the wiring pattern 12. When the slider 3 is mounted on the gimbal spring 1 according to this embodiment, the adhesive agent is restricted from spreading by the two dummy thin-film patterns 15. Moreover, the adhesive agent that spreads beyond the dummy thin-film pattern 15 is prevented by the slit 11 from entering into the side of the wiring pattern 12.

Even in this embodiment, the terminals 3B of the slider and the connection terminals on the gimbal spring 1 are connected together by the gold ball 9 shown in FIG. 6B in a state where the slider 3 is mounted on the gimbal spring 1. Even in the magnetic head assembly of this embodiment, therefore, the slider 3 and the gimbal spring 1 are locked at two points. In the magnetic head assembly of this embodiment, however, the slit 11 formed between the portion coupled by the gold ball 9 and the portion coupled by the adhesive agent 8 works to reduce the difference in the contraction or expansion due to the thermal expansion between the slider 3 and the gimbal spring 1. As a result, a reduced effect is exhibited by the two locking points based on the gold ball and the adhesive agent, and the slider warps in a reduced amount with a change in the temperature.

Figure 17:
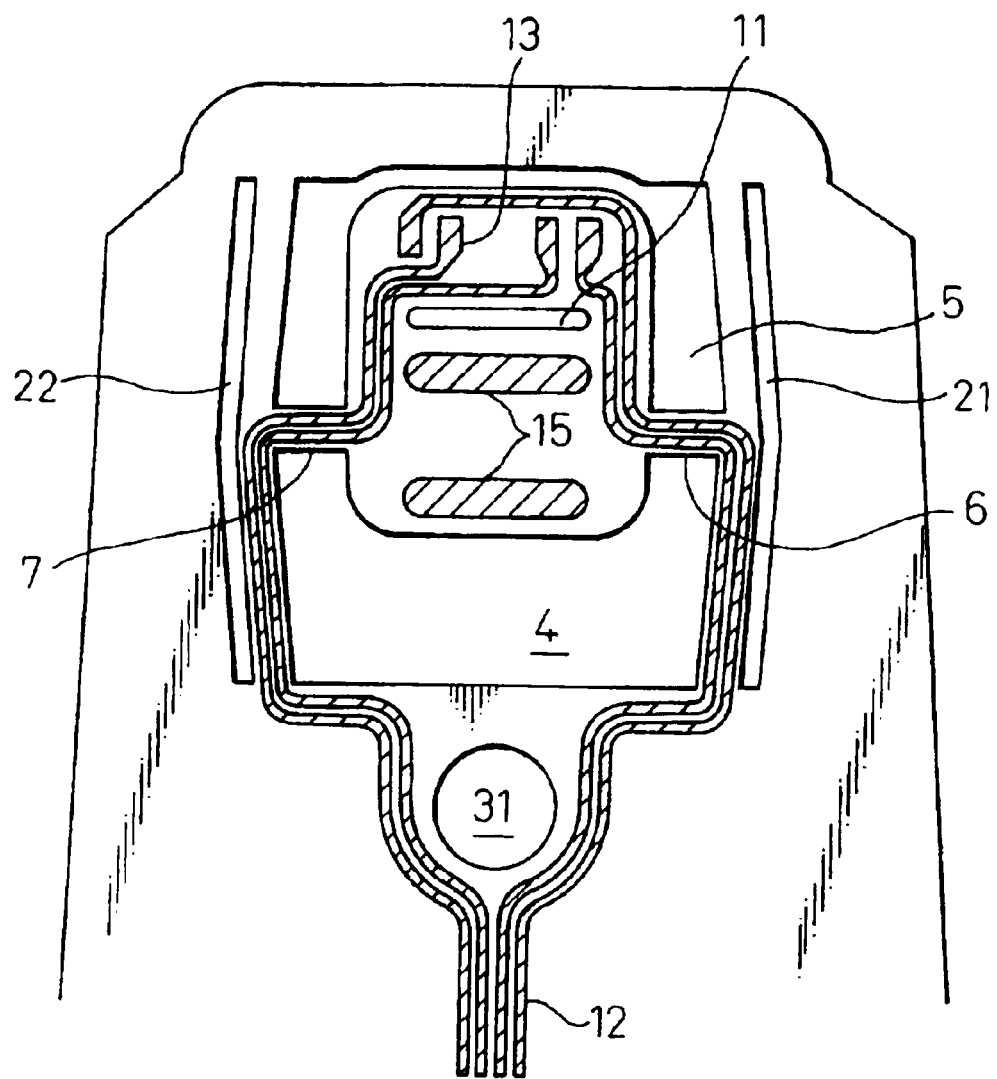
FIG. 17 is a diagram illustrating a third example in which the first aspect of the present invention is adapted to the head assembly of FIG. 14.

FIG. 17 is a modified example from FIG. 16, and in which the gimbal spring 1 shown in FIG. 14 on the side of the load beam 2 is cut short. Even in this embodiment, the terminals 3B of the slider and the connection terminals on the gimbal spring 1 are connected together by the gold ball 9 shown in FIG. 6B in a state where the slider 3 is mounted on the gimbal spring 1. The slit 11 that exists between the portion coupled by the gold ball 9 and the portion coupled by the adhesive agent 8 works to reduce a difference in the contraction or expansion due to thermal expansion between the slider 3 and the gimbal spring 1. As a result, a reduced effect is exhibited by the two locking points based on the gold ball and the adhesive agent, and the slider 3 warps a small amount with a change in the temperature, which are the same effects as those obtained with the magnetic head assembly 30 shown in FIG. 16.

As described above, the magnetic head assembly according to the first aspect of the present invention can be adapted even to the magnetic head assembly 30 disclosed in Japanese Patent Application No. 82110/1993 (U.S. Ser. No. 08/110,771). Even in this case, use of the adhesive agent explained in conjunction with the second aspect of the invention helps further suppress the slider 3 from deforming.

The gimbal spring 1 in the aforementioned embodiments are provided with the pair of beam portions 4, 5 and the head-mounting portion, and is formed in the tip portion of the load beam 2 integrally therewith. However, the gimbal spring 1 according to the present invention can be adapted even to a magnetic head assembly 40 which has a gimbal spring 1 that is separately mounted on the tip portion of the load beam 2. In the embodiment described here, the constituent members which are substantially the same as those of the aforementioned embodiments are denoted by the same reference numerals.

Figure 18:
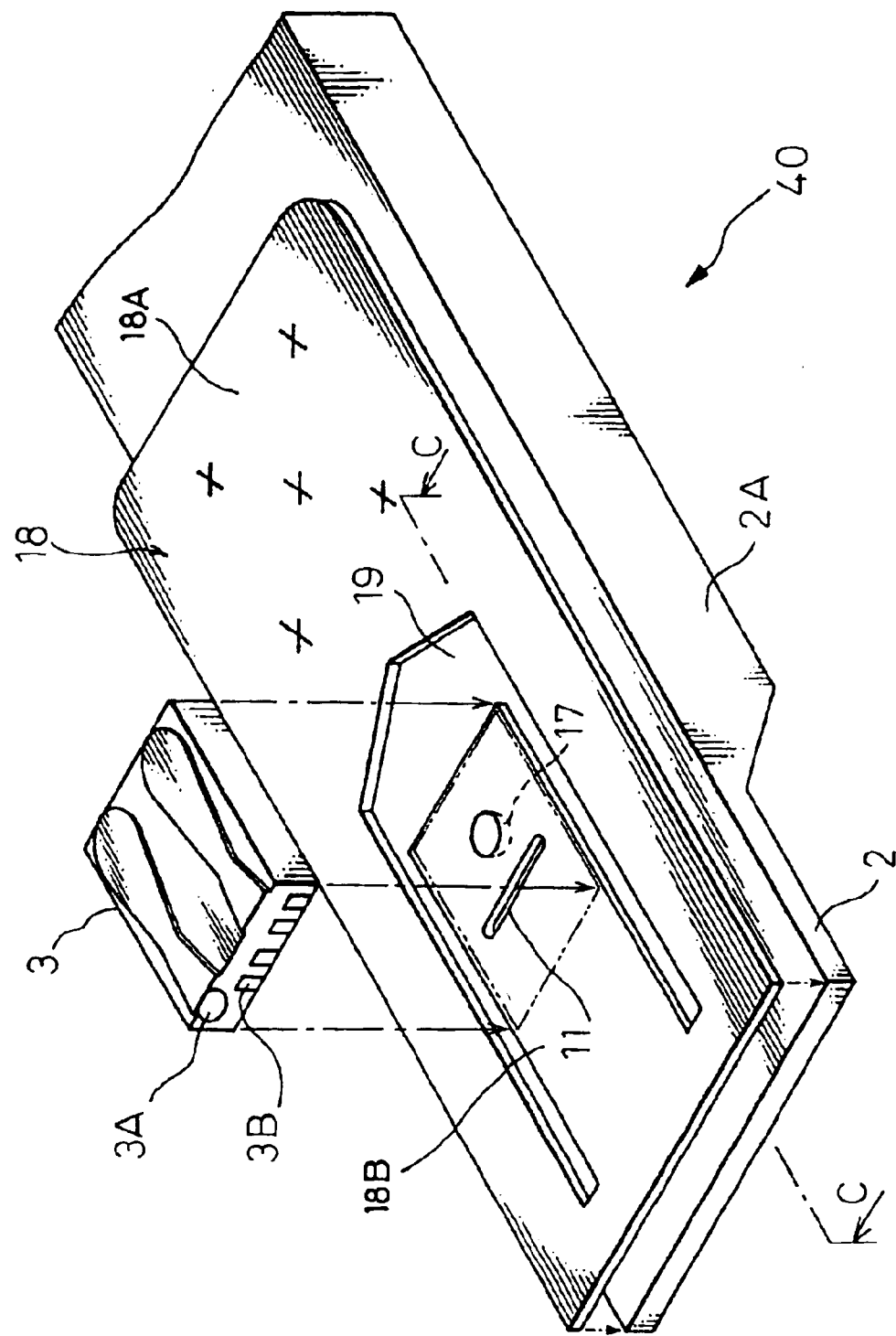
FIG. 18 is a diagram illustrating an example in which the first aspect of the present invention is adapted to the head assembly which is constituted by mounting an independent cantilevered gimbal spring on the tip portion of the load beam.
Figure 19:
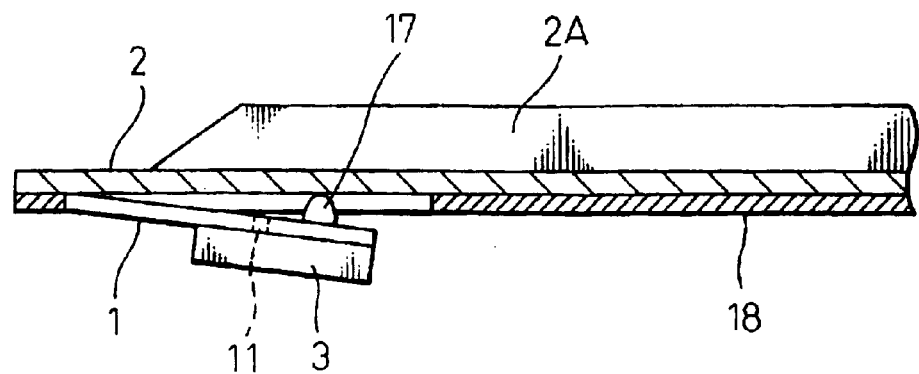
FIG. 19 is a sectional view of the magnetic head assembly along the line C—C in FIG. 18.

FIG. 18 illustrates the constitution of the magnetic head assembly 40 in which a separate gimbal spring is mounted on the load beam. A gimbal spring 18 is secured to the tip portion of the load beam 2 by spot-welding or a similar means. In this embodiment, a tongue-shaped inner plate 18B surrounded by a U-shaped hole 19 with the tip side of the gimbal spring 18 as a vertex serves as an inner plate portion of the gimbal spring that includes a slider-mounting portion on which the slider 3 will be mounted, and the other portion 18A serves as an outer plate portion of the gimbal spring. In FIG. 18, reference numeral 2A denotes a beam that is folded at both ends of the load beam 2 to impart strength to the load beam 2. A protrusion 17 is provided at a required portion on a surface opposed to the load beam 2 on the side of the free end of the inner plate portion 18B of the tongue-shaped gimbal spring, in order to separate the inner plate portion 18B of the tongue-shaped gimbal spring away from the load beam 2. Referring to FIG. 19 illustrating the cross section along the line C—C of FIG. 18 as viewed from the direction of arrow with the slider 3 being mounted on the inner plate portion 18B of the gimbal spring, the tip of the protrusion 21 comes into contact with the load beam 2 to separate the gimbal spring 1 away from the load beam 2.

When the present invention is to be adapted to the thus constituted magnetic head assembly 40, a slit 11 should be provided on the side of the base portion of the gimbal spring 1 (on the side of the tip of the load beam 2).

Figure 20:
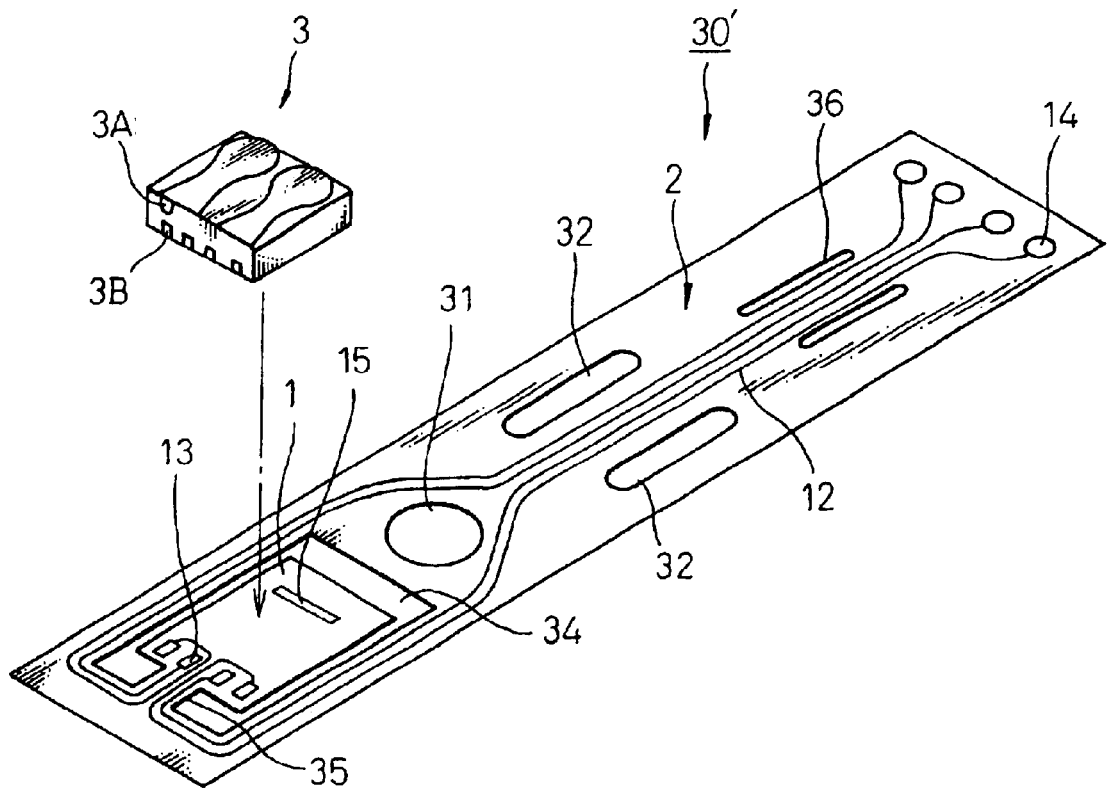
FIG. 20 is a perspective view illustrating the other constitution of the existing head assembly to which the present invention is adapted wherein the gimbal spring is provided in a tip portion of the load beam integrally therewith.

FIG. 20 illustrates the other constitution of a magnetic head assembly 30' disclosed in Japanese Patent Application No. 82110/1993 (U.S. Ser. No. 08/110,771). Even in this constitution, the same constituent members as those of the aforementioned embodiment are denoted by the same reference numerals. That is, reference numeral 1 denotes the gimbal spring, 2 denotes the load beam, 3 denotes the slider having the magnetic head 3A and the connection terminals, 12 denotes the wiring pattern, 13 denotes connection terminals, 14 denotes the output terminals, 15 denotes the dummy thin-film pattern, 31 and 32 denotes holes for mounting jigs, and 36 denotes slits. In this embodiment, a C-shaped hole 34 is formed at the tip portion of the load beam 2 and the gimbal spring 1 is formed to be a tongue-like shape by the C-shaped hole 34. The gimbal spring 1 is connected to the load beam 2 by a beam portion 35.

The same constitution explained in FIGS. 15 to 17 are adaptable for the embodiment as shown in FIG. 20, and the same effect as explained in FIGS. 15 to 17 can be obtained by this embodiment.

According to the first aspect of the present invention as described above, it is allowed to control the adhesion area between the slider and the gimbal spring as well as to decrease the effect caused by two points at which the slider and the gimbal spring are locked together by using the gold ball and the adhesive agent. As a result, a change in the warping amount of the slider due to a change in the ambient temperature is suppressed contributing greatly to accomplishing high-density recording by the magnetic disk drive.

According to the second aspect of the present invention, the Young's modulus after hardening of the adhesive agent that bonds the slider and the gimbal spring together is properly selected in order to decrease the warping amount of the slider when the temperature in the magnetic disk drive is changed. As a result, the flying height of the head due to the warping of the slider is decreased, contributing to improving reading and writing characteristics of the drive and to improving reliability in the floating performance.

What is claimed is:

1. A magnetic head assembly comprising a slider having a magnetic head for reading data from, and writing data onto, a magnetic recording medium, and a gimbal spring on which said slider is mounted with an adhesive agent, wherein:

said gimbal spring is formed integrally with a load beam, and is supported by said load beam via beam portions;

a thin-film wiring pattern formed on said load beam is extended to a surface of said gimbal spring via said beam portions and is formed on said surface, the tip of said wiring pattern serves as a terminal portion corresponding to the position of input/output terminals of the magnetic head that is integrally formed on the tip of said slider, the input/output terminals of said slider and the terminal portion of said wiring pattern are connected together by electrically conducting bonding, and said slider is locked on said gimbal spring at two points by the electrically conducting bonding and by said adhesive agent; and a plurality of thin-film dummy patterns having the same height as the height of said wiring pattern are provided at a position where said adhesive agent will be dropped on said surface of said gimbal spring, and said adhesive agent is dropped in the area sandwiched by said thin-film dummy patterns on said gimbal spring.

2. A magnetic head assembly according to claim 1, wherein the material of said gimbal spring is SUS, and the Young's modulus after hardening of the adhesive agent is smaller than about $1/3000$ of the Young's modulus of the gimbal spring material.

* * * * *